(12) United States Patent
Goh et al.

(10) Patent No.: US 8,411,316 B2
(45) Date of Patent: Apr. 2, 2013

(54) METHOD AND APPARATUS FOR PRINTING IMAGES COMPRISING INDIVIDUAL INFORMATION CORRESPONDING TO FACE RECOGNITION INFORMATION ON SECOND SIDE OF SHEET OF PRINTING PAPER

(75) Inventors: Ji-hyun Goh, Changwon (KR); Sung-cheol Bae, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 906 days.

(21) Appl. No.: 12/218,436

(22) Filed: Jul. 15, 2008

(65) Prior Publication Data

US 2009/0051941 A1 Feb. 26, 2009

(30) Foreign Application Priority Data

Aug. 20, 2007 (KR) ........................ 10-2007-0083430

(51) Int. Cl.
*G06F 15/00* (2006.01)
(52) U.S. Cl. ............................ 358/1.4; 358/1.1; 358/1.15
(58) Field of Classification Search .................... 358/1.1, 358/1.4, 1.15
See application file for complete search history.

(56) References Cited

U.S. PATENT DOCUMENTS

| 5,787,186 | A | 7/1998 | Schroeder |
| 6,185,000 | B1 | 2/2001 | Shiota et al. |
| 6,646,754 | B1 | 11/2003 | Redd et al. |
| 2001/0026631 | A1 | 10/2001 | Slogum et al. |
| 2003/0101218 | A1 | 5/2003 | Usami |
| 2003/0191766 | A1* | 10/2003 | Elin .............................. 707/100 |
| 2004/0189807 | A1 | 9/2004 | Smith |
| 2005/0181361 | A1* | 8/2005 | Kim .................................. 435/6 |
| 2006/0265452 | A1 | 11/2006 | Shirasaka |
| 2007/0003113 | A1* | 1/2007 | Goldberg ...................... 382/118 |
| 2007/0171460 | A1* | 7/2007 | Cahill .......................... 358/1.15 |
| 2007/0195364 | A1* | 8/2007 | Umehara et al. ............. 358/1.15 |

FOREIGN PATENT DOCUMENTS

| CN | 1184542 A | 6/1998 |
| CN | 1422067 A | 6/2003 |
| CN | 1988590 A | 6/2007 |
| CN | 101055592 A | 10/2007 |
| JP | 2005-086516 A | 3/2005 |
| WO | WO 2006/091869 A2 | 8/2006 |

OTHER PUBLICATIONS

Office Action established for CN 200810130857.X (Jun. 24, 2011).
Examination Report established for GB 0813925.5 (Oct. 19, 2011).
Office Action established for CN 200810130857.X (Mar. 1, 2012).
Office Action established for CN 200810130857.X (Oct. 9, 2012).

* cited by examiner

*Primary Examiner* — Qian Yang
(74) *Attorney, Agent, or Firm* — Drinker Biddle & Reath LLP

(57) ABSTRACT

An apparatus and method of printing a personal image including at least one person, and individual information corresponding to the person or location information of a place in which the personal image was captured, on respective sides of a sheet of printing paper. The apparatus and method can print the image and individual information by providing an image file comprising a personal image including at least one person and face recognition information of the person to a printing apparatus, printing the personal image on a first side of the sheet of printing paper, and printing individual information corresponding to the face recognition information on a second side of the sheet of printing paper.

34 Claims, 21 Drawing Sheets

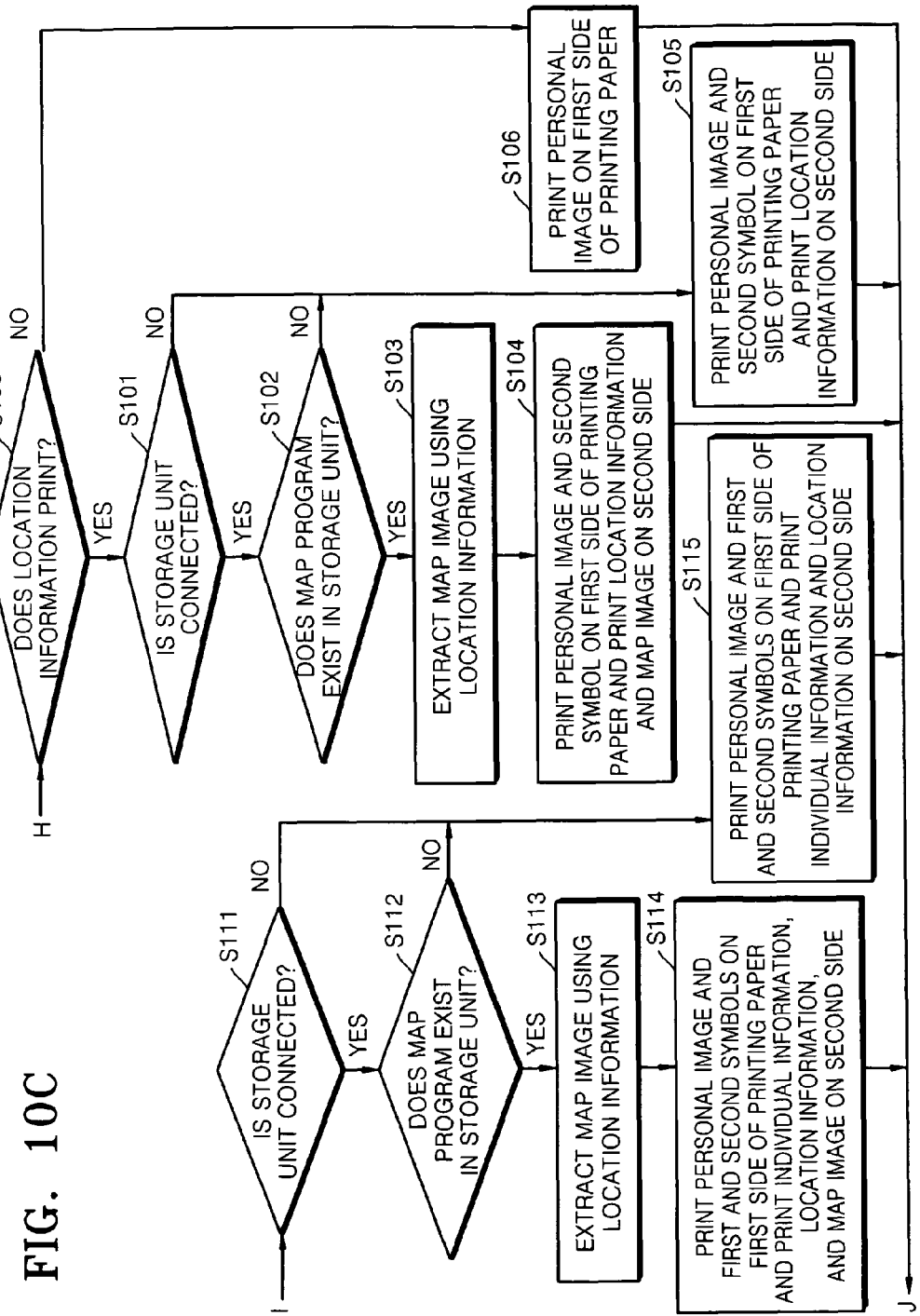

METHOD AND APPARATUS FOR PRINTING IMAGES COMPRISING INDIVIDUAL INFORMATION CORRESPONDING TO FACE RECOGNITION INFORMATION ON SECOND SIDE OF SHEET OF PRINTING PAPER

CROSS-REFERENCE TO RELATED PATENT APPLICATION

This application claims the benefit of Korean Patent Application No. 10-2007-0083430, filed on Aug. 20, 2007, in the Korean Intellectual Property Office, the entire contents of which is incorporated herein by reference.

BACKGROUND OF THE INVENTION

1. Field of the Invention

The present invention relates to an apparatus and method for printing images on both sides of paper.

2. Description of the Related Art

People typically take many photographs throughout their life, such as photographs of school excursions and weddings. They also may develop and separately keep significant photographs. However, as time goes by, they may not remember the names of persons in the photographs. In order to prevent this, they sometimes handwrite additional memos on photo albums. This handwriting can be time consuming.

Thus, the present applicant suggests a method of printing a photograph with information pertaining to people in captured images or information regarding the event or time during which the image was captured.

SUMMARY OF THE INVENTION

The present invention provides an image printing apparatus and method for easily remembering an image capturing situation by having images and information printed on both sides of a printed matter.

Accordingly, an embodiment of the present invention provides an image printing method for printing on the both sides of printing paper, the method comprising providing an image file comprising a personal image including at least one person and face recognition information of the person to a printing apparatus, printing the personal image on a first side of the sheet of printing paper, and printing individual information corresponding to the face recognition information on a second side of the sheet of printing paper.

The image printing method may further comprise extracting individual information corresponding to the face recognition information from the image file when the image file further comprises the individual information.

The image printing method may also comprise extracting individual information corresponding to the face recognition information of the image file from a database of an internal storage unit of the printing apparatus when the database for individual information according to face recognition information is stored in the internal storage unit. In addition, the image printing method may comprise extracting individual information corresponding to the face recognition information of the image file from a database of an external storage unit of the printing apparatus when the database for individual information according to face recognition information is stored in the external storage unit.

The image printing method may further comprise determining the latest individual information among at least two pieces of individual information selected from first individual information, second individual information, and third individual information, and extracting the latest individual information when the first individual information according to the face recognition information is stored in the image file, the second individual information according to the face recognition information is stored in the internal storage unit of the printing apparatus, and the third individual information according to the face recognition information is stored in the external storage unit of the printing apparatus. The non-extracted individual information may be updated to the latest individual information.

The image printing method may further comprise previewing. That is, the image printing method may further comprise displaying the personal image to be printed on the first side of the sheet of printing paper or the individual information to be printed on the second side of the sheet of printing paper before the printing is performed. The image printing method may also comprise displaying an icon indicating the existence of the individual information of the person. If the icon is selected, the individual information may be displayed and the displayed individual information may be confirmed, and if the individual information is incorrect information, the individual information may be modified.

The image printing method may further comprise printing a symbol indicating that the individual information is printed on the second side of the sheet of printing paper on the first side of the sheet of printing paper. The face recognition information may further comprise face position information, and a contour of a face corresponding to the face position information may be further printed on the second side of the sheet of printing paper.

Another embodiment of the present invention provides an image printing method comprising providing an image file including a personal image comprising at least one person, face recognition information of the person, and individual information corresponding to the face recognition information or location information to the printing apparatus, printing the personal image on a first side of the sheet of printing paper, and printing the individual information corresponding to the face recognition information or the location information on a second side of the sheet of printing paper. The individual information may be private information of the person, such as name, cellular phone number, e-mail address, etc. of the person.

The location information may comprise surrounding conditions at the time the personal image was captured, such as the name of a place in which the person was captured, latitude of the place, longitude of the place, weather of the place, the time when the personal image was captured, etc. The location information such as latitude, longitude may be obtained using Global Positioning System (GPS).

The image printing method may further comprise displaying the personal image to be printed on the first side of the sheet of printing paper or the individual information or the location information to be printed on the second side of the sheet of printing paper before the printing is performed. The image printing method may also comprise displaying a first icon indicating the existence of the individual information or a second icon indicating the existence of the location information. If the first icon is selected, the individual information may be displayed and if the second icon is displayed, the location information may be displayed.

The image printing method may further comprise printing on the first side of the sheet of printing paper, a first symbol indicating that the individual information is printed on the second side of the sheet of printing paper or a second symbol indicating that the location information is printed on the second side of the sheet of printing paper. The face recognition information may comprise face position information, and a contour of a face corresponding to the face position information may be further printed on the second side of the sheet of printing paper. The image printing method may also comprise printing a map corresponding to the location information on the second side of the sheet of printing paper.

Another embodiment of the present invention provides an image printing apparatus comprising a paper feeder for feeding printing paper, a storage unit for storing an image file comprising a personal image comprising at least one person and face recognition information of the person, a signal processing unit for extracting individual information of the person corresponding to the face recognition information of the image file, and a printing engine for printing the personal image on a first side of a sheet of printing paper and printing the individual information corresponding to the face recognition information of the image file on a second side of the sheet of printing paper. Since the image file comprises the individual information corresponding to the face recognition information, the signal processing unit may extract the individual information from the image file.

The image printing apparatus may further comprise an internal storage unit, which comprises an individual information database according to the face recognition information, and an external storage unit comprising an individual information database according to the face recognition information. The signal processing unit may extract the individual information corresponding to the face recognition information of the image file from the database of the internal storage unit. The signal processing unit may also extract the individual information of the person corresponding to the face recognition information of the image file from the external storage unit via a connector. The external storage unit may be a storage device, a server, or a storage medium in which the database is stored. For example, the storage device may be a Personal Computer (PC), a cellular phone, or a flash memory, in which the database is stored. The server may be an information providing site in which the database is stored via the Internet. The storage medium may be a memory card, a Hard Disk Drive (HDD), or a Floppy Drive (FD).

The signal processing unit may obtain first individual information from the image file, second individual information from the internal storage unit, and third individual information from the external storage unit via the connector. When at least two pieces of individual information of the first to third individual information are selected, the latest individual information may be determined and extracted, and the non-extracted individual information may be updated to the latest individual information.

The image printing apparatus may further comprise a display unit displaying the personal image or the individual information. The display unit may further display a first icon indicating the existence of the individual information of the person.

The printing engine may further print a first symbol indicating that the individual information of the person is printed on the first side of the sheet of printing paper. The printing engine may further print a contour of a face corresponding to the face position information, which includes face position information as the face recognition information, on the second side of the sheet of printing paper. The image file may comprise location information, and the printing engine may print the personal image on the first side of the sheet of printing paper and print the location information on the second side of the sheet of printing paper without or with the individual information. The signal processing unit may acquire a map according to the location information, and the printing engine may further print a map corresponding to the location information on the second side of the sheet of printing paper. The image printing apparatus may further comprise a connector connected to the external storage unit in which the map according to the location information is stored, wherein the signal processing unit can obtain the map corresponding to the location information from the external storage unit via the connector.

The image printing apparatus may further comprise a display unit displaying the location information. The display unit may display a second icon indicating the existence of the location information. The second icon may be displayed with the personal image, and if the second icon is selected, the location information or the map may be displayed on the display unit. The printing engine may print a second symbol, which indicates that the location information is printed on the second side of the sheet of printing paper, on the first side of the sheet of printing paper.

BRIEF DESCRIPTION OF THE DRAWINGS

The above and other features and advantages of the present invention will become more apparent by describing in detail exemplary embodiments thereof with reference to the attached drawings in which:

FIGS. 10A, 10B and 10C are flowcharts illustrating an example of an image printing method according to another embodiment of the present invention;

DETAILED DESCRIPTION OF THE EMBODIMENTS

The present invention will be described in detail by explaining embodiments of the invention with reference to the attached drawings.

Figure 1:
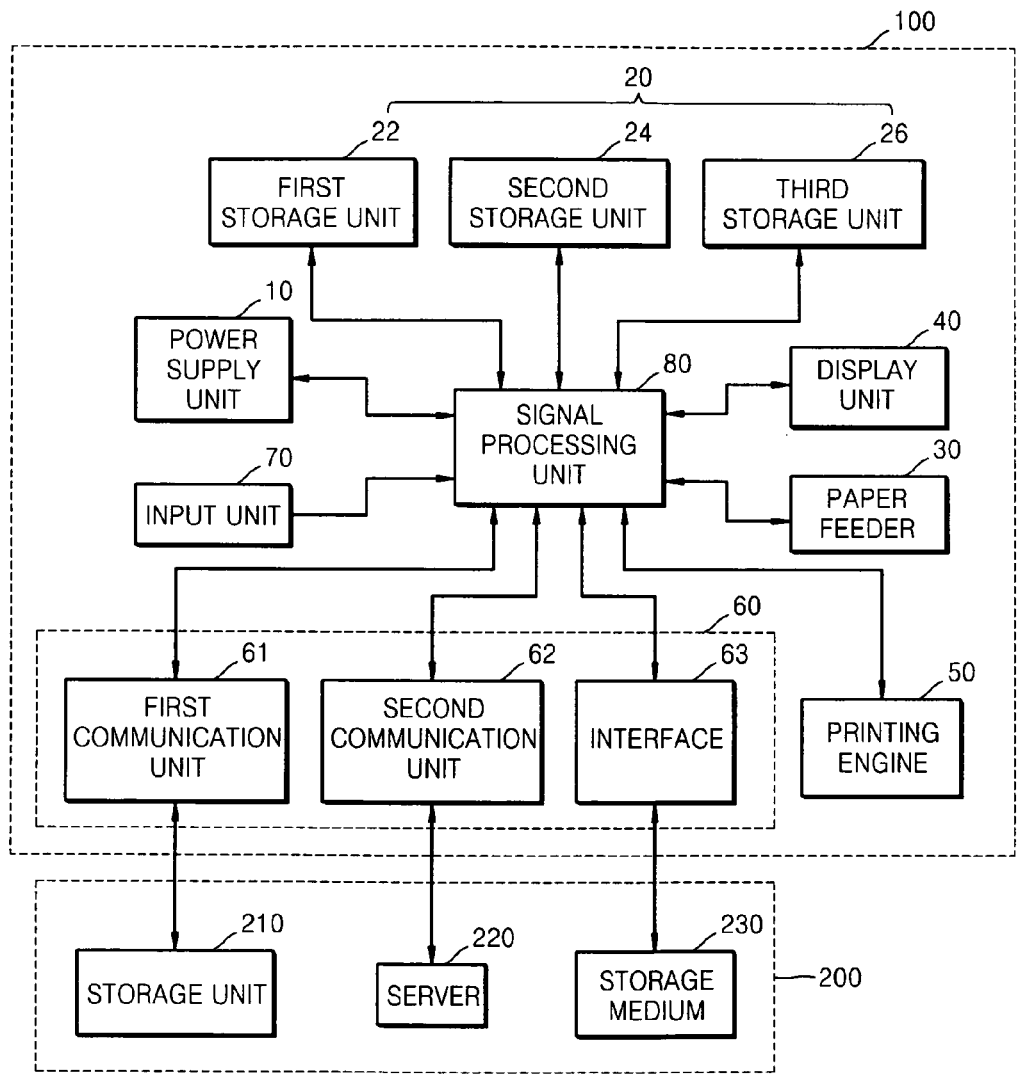
FIG. 1 is a block diagram of an example of an image printing apparatus according to an embodiment of the present invention.

FIG. 1 is a block diagram of an example of an image printing apparatus 100 according to an embodiment of the present invention. Referring to FIG. 1, the image printing apparatus 100 according to an embodiment of the present invention includes a power supply unit 10, a storage unit 20, a paper feeder 30, a display unit 40, a printing engine 50, a connector 60, an input unit 70, and a signal processing unit 80. The power supply unit 10 supplies predetermined power to drive the image printing apparatus 100.

The storage unit 20 can be divided into a first storage unit 22, a second storage unit 24, and a third storage unit 26. For example, the first storage unit 22 can temporarily store an image file including a personal image comprising at least one person and face recognition information of the person, and the second storage unit 24 can store an individual information database according to the image file or the face recognition information. The first storage unit 22 temporarily stores data for signal processing or display, whereas the second storage unit 24 is an internal storage unit, which can store data unless an external signal is input by a user. The third storage unit 26 stores a program for driving the image printing apparatus 100.

The image file basically includes a personal image comprising at least one person and face recognition information of the person. The face recognition information may comprise geometric factors, such as a position and size of each component of a face and a distance between any two of the components of the face, e.g. feature points of the face such as eyes, nose, and mouth. A face can be recognized by matching the geometric factors with a previously stored database, or the face recognition can be performed by projecting an input facial image onto the geometric factors and extracting features by means of comparison or correlation of the input facial image with a projected object of each stored facial image. In another manner, a face can be recognized by comparing the input facial image with a template image showing the entire face and analyzing a correlation diagram according to the comparison. In addition, the face recognition information does not necessarily comprise geometric factors, and may further include information regarding learning and recognition of a neural network for a learning-type recognition method using an artificial neural network. The face recognition information can be stored in a header of the image file.

The image file can include individual information corresponding to the face recognition information or location information of the time the personal image was captured. The individual information can be directly input by the user during generation of the image file after the image is captured, or may be extracted through connection with any suitable device, such as a Personal Computer (PC), a cellular phone, or a server and stored with the image file. In the current embodiment, the individual information may comprise a name, address, e-mail address, cellular phone number, and telephone number of the person. If the individual information is included in the image file, the individual information database according to the face recognition information may not be stored in the second storage unit 24 or an external storage unit 200 to be described later. The individual information can be obtained from the image file and printed on a second side of a sheet of printing paper. This will be described in more detail when the external storage unit 200 or the signal processing unit 80 is described.

The image file may include location information, and the location information can be automatically generated using, for example, a GPS receiver during generation of the image file and included in the image file. According to another embodiment of the present invention, the location information can be directly input by the user during generation or editing of the image file. According to another embodiment of the present invention, the location information can be obtained from a PC, a cellular phone, or a server using the Internet. For example, a name of a place may be obtained from a map providing site based on latitude and longitude. The location information is information regarding an environment in which a personal image of at least one person is captured and may include a name, an address, a latitude, a longitude, and weather such as temperature and humidity, of a place and the time at which the personal image is captured. For example, the location information such as latitude, longitude may be obtained using Global Positioning System (GPS).

The paper feeder 30 feeds printing paper. The display unit 40 displays printing related information, such as a power on/off status of the image printing apparatus 100 and a printing paper existence status and can comprise a Liquid Crystal Display (LCD) or an Organic Light Emitting Diode (OLED). In particular, the display unit 40 can display an image or information to be printed on printing paper before printing is performed. The display unit 40 can be included in the image printing apparatus 100 but not limited thereto. That is, the display unit 40 may be a separate display device.

For example, the display unit 40 can display in advance a personal image to be printed on a first side of a sheet of printing paper or individual information of the person or location information to be printed on a second side of the sheet of printing paper. Furthermore, when the personal image is displayed on the display unit 40, a first icon indicating that the individual information of the person exists can be displayed with the personal image. If the first icon is selected, the display unit 40 can display the individual information corresponding to the person. According to another embodiment of the present invention, a second icon indicating that the location information exists can be displayed with the personal image on the display unit 40, and if the user selects the second icon, the location information can be displayed. The individual information or the location information can be displayed in a pop-up window. The user can select the first or second icon by means of the input unit 70, and the input unit 70 provides a selection function using various function keys or a touch screen.

If face position information is included as the face recognition information, the display unit 40 can further display a contour of a face corresponding to the face position information. According to another embodiment of the present invention, the display unit 40 can further display a map corresponding to the location information. The map corresponding to the location information can be obtained from the second storage unit 24, which is an internal storage unit, or the external storage unit 200. However, since the map is variable, it is preferable that the map corresponding to the location information be obtained from a server 220 of the external storage unit 200, such as a map providing site.

The printing engine 50 prints a personal image on a first side of a sheet of printing paper and individual information of the person or location information on a second side of the sheet of printing paper. The printing engine 50 may further print a first symbol and/or a second symbol, which indicates that the individual information or the location information has been printed, on the first side of the sheet of printing paper. The printing engine 50 may further print a contour of a face or a map associated with the individual information or the location information on the second side of the sheet of printing paper. The printing engine 50 can print the first side and then the second side or simultaneously print both sides by arranging a print head at a front side and a rear side of the printing paper, or arrange a print head on only one side of the printing paper and print both sides by rotatably feeding the printing paper.

The connector 60 is connected to the external storage unit 200. The external storage unit 200 can store an image file or an individual information database according to face recognition information. Thus, the image file or the individual information can be obtained from the external storage unit 200 via the connector 60. According to the storage unit 20, if an image file includes individual information according to face recognition information, the database may not be stored in the external storage unit 200. The connector 60 can be divided into a first communication unit 61 transmitting and receiving information to and from a storage unit 210 of the external storage unit 200, a second communication unit 62 connected to the server 220, and an interface 63 connected to a storage medium 230 to read information.

The storage unit 210 can include any of a plurality of devices in which an image file or a database is stored even if a major function of the devices is not a function of storing the image file or the database. For example, the storage unit 210 may be a digital capturing device generating and storing an image file by capturing a person and recognizing a face of the person, a PC receiving and storing the image file from the digital capturing device, or a cellular phone. The storage unit 210 can transmit the image file or individual information according to face recognition information to the image printing apparatus 100 via the first communication unit 61 using a wired method, such as cable, or a wireless method, such as Radio Frequency Identification (RFID) or Bluetooth.

The server 220 is also an example of the external storage unit 200 and may be a personal mail server or an information providing server. For example, if an image file is stored in the mail server, the image file can be read into the image printing apparatus 100 by accessing the mail server via the second communication unit 62. The individual information according to face recognition information also can be read by accessing the information providing server in which the database is stored.

In addition, the connector 60 includes the interface 63. The interface 63 is connected to the storage medium 230, such as a memory card, a Hard Disc Drive (HDD), or a Floppy Drive (FD), in which the image file or the individual information database is stored. Desired information can be read from the storage medium 230 via the interface 63.

When the icon is selected or when individual information or location information is incorrect and modified, the selection or modification can be performed by means of the input unit 70. The input unit 70 also can be used to input an external signal for operating the image printing apparatus 100. The input unit 70 may comprise buttons or a touch screen. The signal processing unit 80 controls a general operation of the image printing apparatus 100 according to the program stored in the third storage unit 26.

If first individual information according to face recognition information is included in an image file, second individual information according to the face recognition information is stored in the second storage unit 24, which is an internal storage unit, and third individual information according to the face recognition information is stored in the external storage unit 200, the signal processing unit 80 determines the latest information from among the first individual information, the second individual information, and the third individual information included or stored in the image file and extract the determined information, the second storage unit 24, and the external storage unit 200. The non-extracted information can be updated to the latest information.

The image printing apparatus 100 described above acquires individual information using face recognition information or location information included in an image file and prints the individual information or the location information on a rear side of printing paper on which a personal image is printed, helping the user to easily recall the capturing situation. Hereinafter, an example of an image printing method according to an embodiment of the present invention will now be described with reference to the attached drawings.

Figure 2:
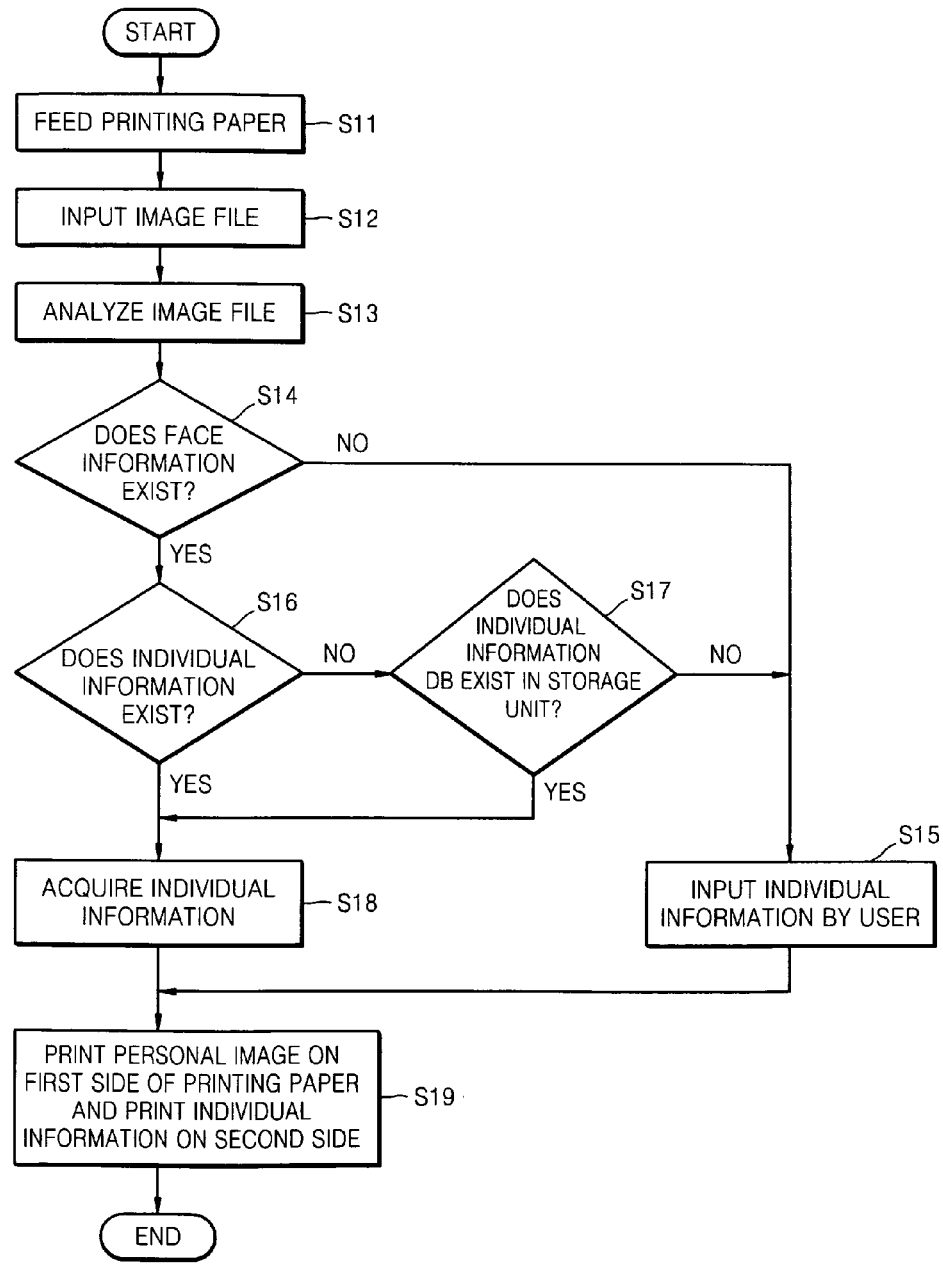
FIG. 2 is a flowchart illustrating an example of an image printing method according to an embodiment of the present invention.

FIG. 2 is a flowchart illustrating an example of an image printing method according to an embodiment of the present invention. In the current embodiment, a personal image is printed on a first side of a sheet of printing paper, and individual information of the person is printed on a second side of the sheet of printing paper.

Referring to FIG. 2, a sheet of printing paper is fed into an image printing apparatus in operation S11, and an image file including a personal image comprising at least one person is input to the image printing apparatus in operation S12. However, the present invention is not limited to this arrangement, and the feeding of the sheet of printing paper can be performed after inputting or analyzing the image file only if the feeding performed before the printing is performed. In the image printing methods according to other embodiments of the present invention, the feeding of the sheet of printing paper is not limited to the time before an image file is input and can be performed the feeding performed before the printing is performed.

The input image file is analyzed in operation S13, and it is determined in operation S14 whether the image file includes face recognition information. If it is determined in operation S14 that the image file does not include face recognition information, a user inputs individual information of the person in operation S15. If it is determined in operation S14 that the image file includes face recognition information, it is determined in operation S16 whether the image file includes individual information.

If it is determined in operation S16 that the image file does not include individual information, it is determined in operation S17 whether a storage unit includes an individual information database (DB) according to the face recognition information. The storage unit may be an internal storage unit installed in the image printing apparatus or an external storage unit outside the image printing apparatus. The external storage unit may be a PC, a cellular phone, a server, or a memory card in which the DB is stored.

If the storage unit does not include individual information, the user can directly input the individual information in operation S15. If the image file or the storage unit includes individual information, the individual information is extracted in operation S18, and the personal image is printed on a first side of the sheet of printing paper and the individual information is printed on a second side of the sheet of printing paper in operation S19. In this embodiment, by printing the personal image on the first side of the sheet of printing paper and the individual information of the person on the second side of the sheet of printing paper, the memory of the captured personal image can be easily recalled with only the printed matter.

Figure 3A:
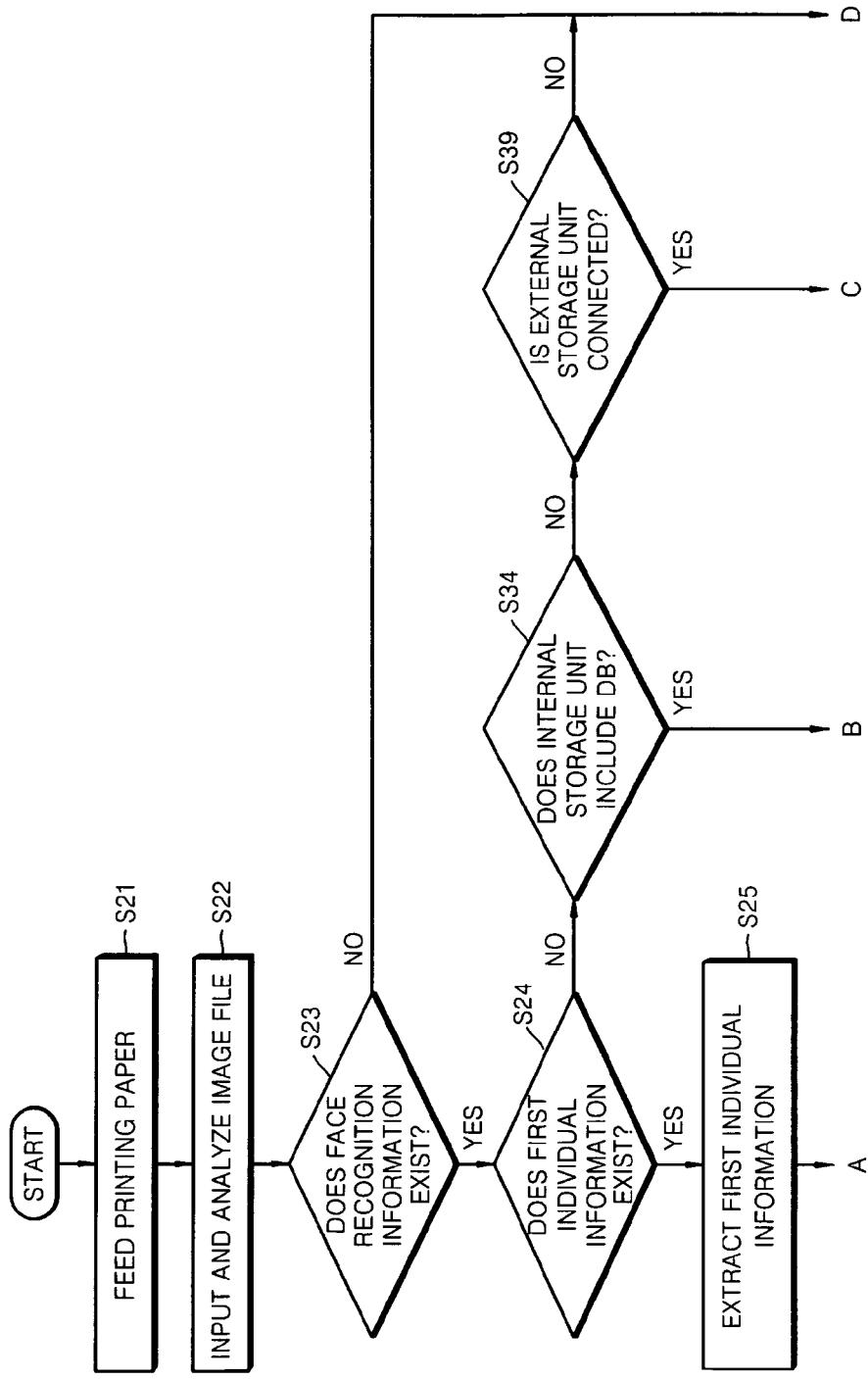
FIGS. 3A, 3B and 3C are flowcharts illustrating an example of an image printing method according to another embodiment of the present invention.
Figure 3B:
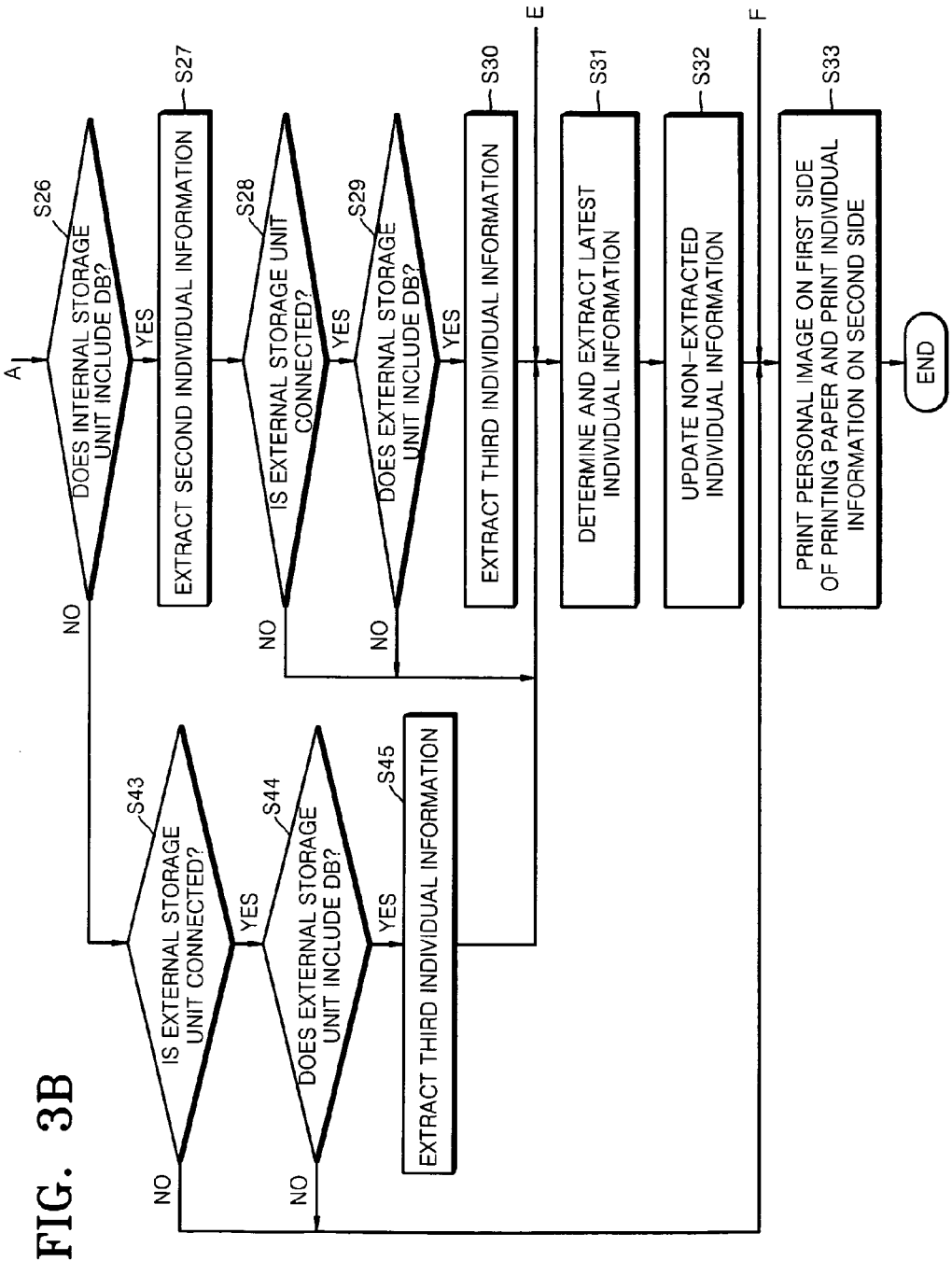
Figure 3C:
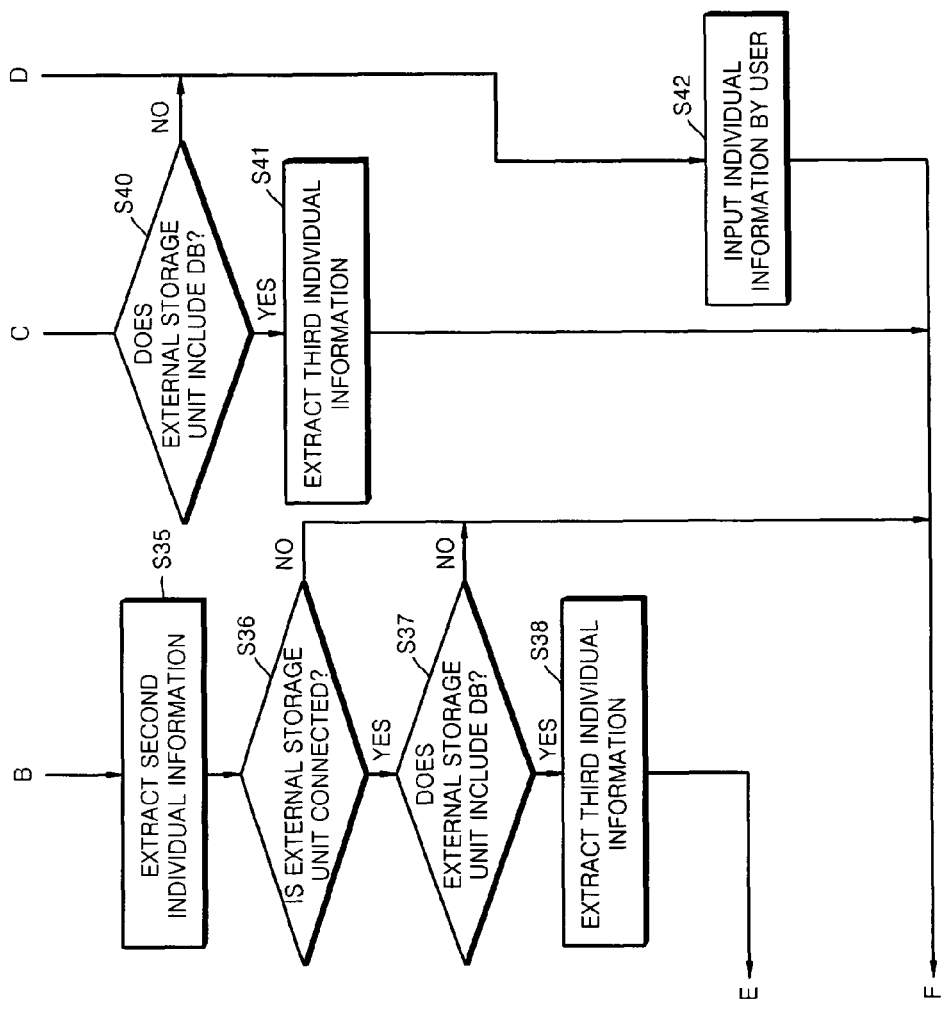

FIGS. 3A, 3B and 3C are flowcharts illustrating an example of an image printing method according to another embodiment of the present invention. In the current embodiment, the latest individual information is printed on a second side of a sheet of printing paper.

Referring to FIG. 3A, a sheet of printing paper is fed into an image printing apparatus in operation S21, and an image file is input in operation S22. The image file includes a personal image including at least one person. The image file is analyzed in operation S22, and it is determined in operation S23 whether the image file includes face recognition information. If it is determined in operation S23 that the image file includes face recognition information, it is determined in operation S24 whether the image file includes first individual information corresponding to the face recognition information.

If it is determined in operation S24 that the image file includes first individual information, the first individual information is extracted in operation S25. Referring to FIG. 3B, it is determined in operation S26 whether an internal storage unit includes an individual information DB according to the face recognition information. The internal storage unit comprises a storage unit installed in the image printing apparatus. If it is determined in operation S26 that the internal storage unit includes an individual information DB, second individual information corresponding to the face recognition information is extracted from the individual information DB in operation S27.

It is determined in operation S28 whether an external storage unit is connected to the image printing apparatus. The external storage unit is disposed outside the image printing apparatus and may be a PC, a cellular phone, or a server, which can store the individual information DB. If it is determined in operation S28 that the external storage unit is connected to the image printing apparatus, it is determined in operation S29 whether the external storage unit includes the individual information DB, and if it is determined in operation S29 that the external storage unit includes the individual information DB, third individual information corresponding to the face recognition information is extracted from the individual information DB in operation S30.

The latest individual information is determined among the first individual information, the second individual information, and the third individual information and the latest individual information is extracted in operation S31. The non-extracted individual information is updated in operation S32, and the personal image is printed on a first side of the sheet of printing paper and the extracted, i.e. latest, individual information is printed on a second side of the sheet of printing paper in operation S33.

After extracting the first individual information and the second individual information in operations S25 and S27, if the external storage unit is not connected or the external storage unit does not include the individual information DB, the latest individual information is determined among the first individual information and the second individual information and extracted in operation S31. The non-extracted individual information is updated in operation S32, and the personal image is printed on a first side of the sheet of printing paper and the selected (e.g., the latest) individual information is printed on a second side of the sheet of printing paper in operation S33.

Referring to FIG. 3A, if it is determined in operation S24 that the image file does not include first individual information, it is determined in operation S34 whether the internal storage unit includes the individual information DB. Referring to FIG. 3C, if it is determined in operation S34 that the internal storage unit includes the individual information DB, the second individual information is extracted from the DB in operation S35.

It is determined in operation S36 whether an external storage unit is connected to the image printing apparatus. If it is determined in operation S36 that the external storage unit is connected to the image printing apparatus, it is determined in operation S37 whether the external storage unit includes the individual information DB, and if it is determined in operation S37 that the external storage unit includes the individual information DB, the third individual information is extracted from the individual information DB in operation S38. Referring to FIG. 3B, the latest individual information is determined among the second individual information and the third individual information and extracted in operation S31. The non-extracted individual information is updated in operation S32, and the personal image is printed on the first side of the sheet of printing paper and the extracted (e.g., the latest) individual information is printed on the second side of the sheet of printing paper in operation S33. After extracting the second individual information from the internal storage unit, since the image file does not include the first individual information and the internal storage unit includes the individual information DB, if the external storage unit is not connected or the external storage unit does not include the individual information DB, the personal image is printed on the first side of the sheet of printing paper and the second individual information is printed on the second side of the sheet of printing paper in operation S33.

Referring to FIG. 3A, if the image file does not include the first individual information in and the internal storage unit does not include the individual information DB, it is determined in operation S39 whether an external storage unit is connected to the image printing apparatus. Referring to FIGS. 3A and 3C, if it is determined in operation S39 that the external storage unit is connected to the image printing apparatus, it is determined in operation S40 whether the external storage unit includes the individual information DB, and if it is determined in operation S40 that the external storage unit includes the individual information DB, the third individual information is extracted from the DB in operation S41. Referring to FIG. 3B, the personal image is printed on the first side of the sheet of printing paper and the third individual information is printed on the second side of the sheet of printing paper in operation S33. When the image file does not include the first individual information and the internal storage unit does not include the individual information DB if an external storage unit is not connected or the external storage unit does not include the individual information DB, the user can directly input individual information in operation S42.

Referring to FIGS. 3A and 3C, if it is determined in operation S23 that the face recognition information does not exist, the user can directly input individual information in operation S42. The personal image is printed on the first side of the sheet of printing paper and the input individual information is printed on the second side of the sheet of printing paper in operation S33.

Referring to FIGS. 3A and 3B, after extracting the first individual information in operation S25, if it is determined in operation S26 that the internal storage unit does not include the individual information DB, it is determined in operation S43 whether an external storage unit is connected. If it is determined in operation S43 that an external storage unit is connected, it is determined in operation S44 whether the external storage unit includes the individual information DB, and if it is determined in operation S44 that the external storage unit includes the individual information DB, the third individual information is extracted from the DB in operation S45. Thus, the latest individual information is determined among the first individual information and the third individual information and extracted in operation S31. The non-extracted individual information is updated in operation S32, and the personal image is printed on the first side of the sheet of printing paper and the extracted (e.g., the latest) individual information is printed on the second side of the sheet of printing paper in operation S33.

Referring to FIGS. 3A and 3B, after extracting the first individual information in operation S25, if it is determined in operation S26 that the internal storage unit does not include the individual information DB, and if an external storage unit is not connected or the external storage unit does not include the individual information DB, only the first individual information is extracted as a result. Thus, the personal image is printed on the first side of the sheet of printing paper and the first individual information is printed on the second side of the sheet of printing paper in operation S33.

In the embodiment described above, since individual information can be obtained from at least one of an image file, an internal storage unit, and an external storage unit, correct individual information can be printed by extracting the latest individual information by comparing the individual information and updating the non-extracted individual information. Thus, a person in a printed matter can be easily recalled, and since the latest individual information is printed on a rear side of printing paper, correct information can be obtained in order to show or transmit the printed matter to the person in the future.

Figure 4:
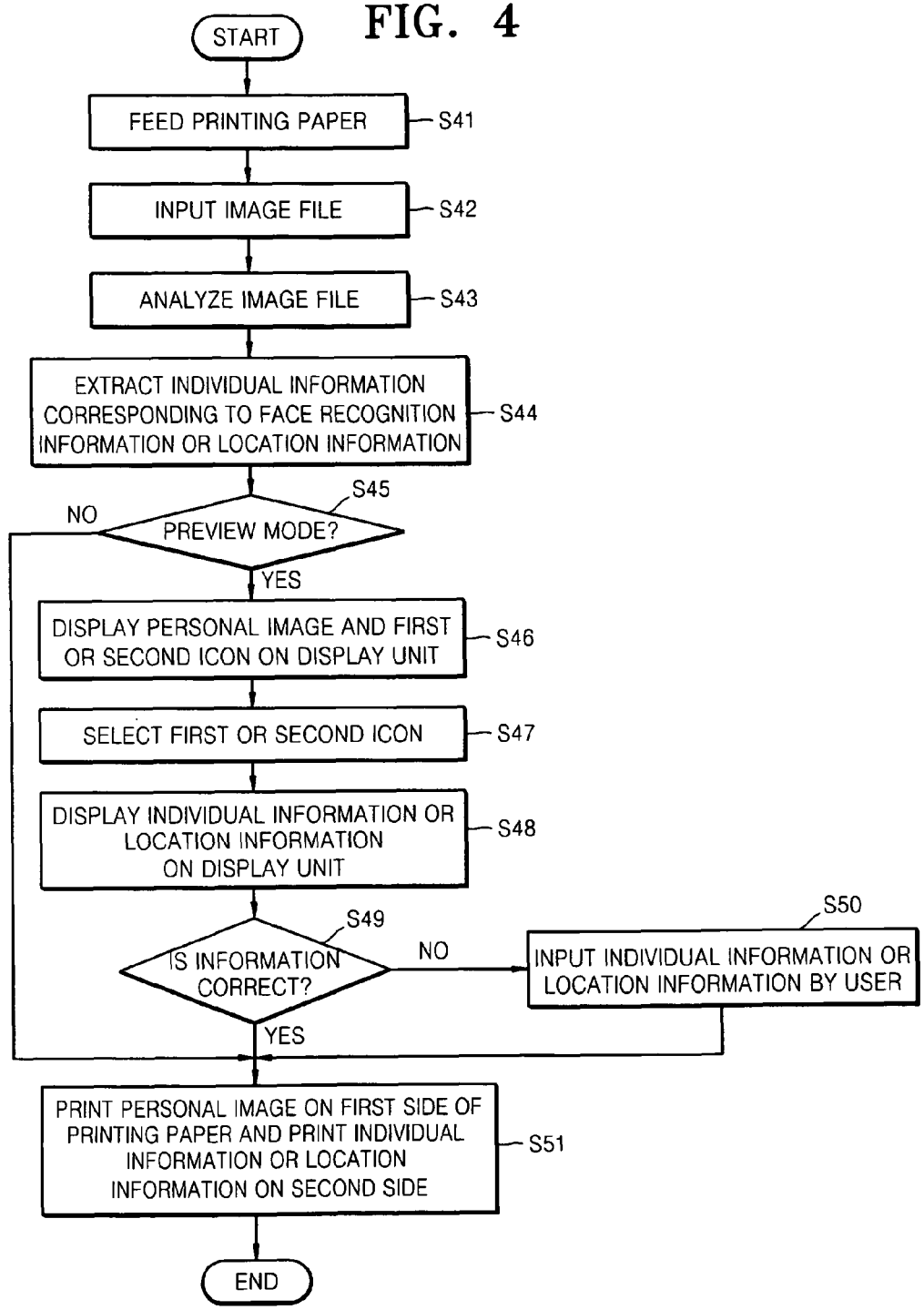
FIG. 4 is a flowchart illustrating an example of an image printing method according to another embodiment of the present invention.
Figure 5:
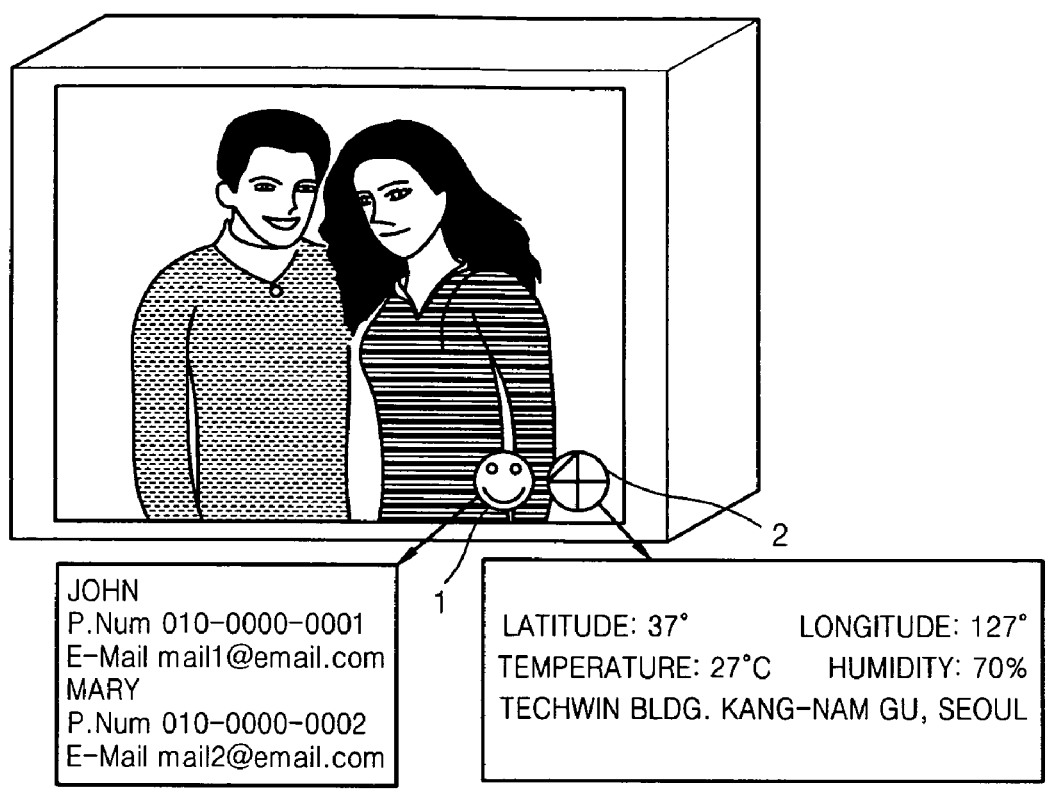
FIG. 5 is an example of an image of a photograph displayed on a display unit in a preview mode described in FIG. 4, according to an embodiment of the present invention.

FIG. 4 is a flowchart illustrating an example of an image printing method according to another embodiment of the present invention. This embodiment includes a preview mode in which an image or information to be printed is displayed on a display unit before printing is performed. FIG. 5 is an image of a photograph displayed on the display unit in the preview mode described in FIG. 4, according to an embodiment of the present invention.

Referring to FIG. 4, a sheet of printing paper is fed into an image printing apparatus in operation S41, and an image file is input in operation S42. In the this embodiment, the image file includes a personal image including at least one person, face recognition information of the person, and individual information corresponding to the face recognition information or location information. The input image file is analyzed in operation S43, and individual information corresponding to face recognition information or location information is extracted from the image file in operation S44.

It is determined in operation S45 before printing whether the preview mode is selected. If the preview mode is selected, the personal image and a first icon indicating the existence of the individual information or a second icon indicating the existence of the location information that are to be printed on a first side of the sheet of printing paper are displayed on a display unit in operation S46.

If the first icon or the second icon is selected in operation S47, the individual information or the location information can be displayed on the display unit in operation S48. Referring to FIG. 5, a personal image including two persons, John and Mary, is displayed on the display unit, and a first icon 1 indicating the existence of the individual information and a second icon 2 indicating the existence of the location information are displayed in the bottom right corner of the display unit. If the first icon 1 is selected, the individual information of John and Mary, for example, cellular phone numbers and e-mail addresses, are displayed in a pop-up window. If the second icon 2 is selected, the location information, for example, latitude, longitude, temperature, humidity, and address of a capturing place, can be displayed in a pop-up window.

It is determined in operation S49 whether the information displayed on the display unit is correct. If it is determined in operation S49 that the information displayed on the display unit is incorrect, a user inputs correct individual information or location information in operation S50. If it is determined in operation S49 that the information displayed on the display unit is correct, the personal image is printed on a first side of the sheet of printing paper and the individual information or the location information is printed on a second side of the sheet of printing paper in operation S51.

If it is determined in operation S45 that the preview mode is not selected, the personal image is printed on a first side of the sheet of printing paper and the individual information or the location information is printed on a second side of the sheet of printing paper in operation S51. By confirming the personal image and the information in the preview mode before printing is performed, incorrect information can be prevented from being printed.

Figure 6:
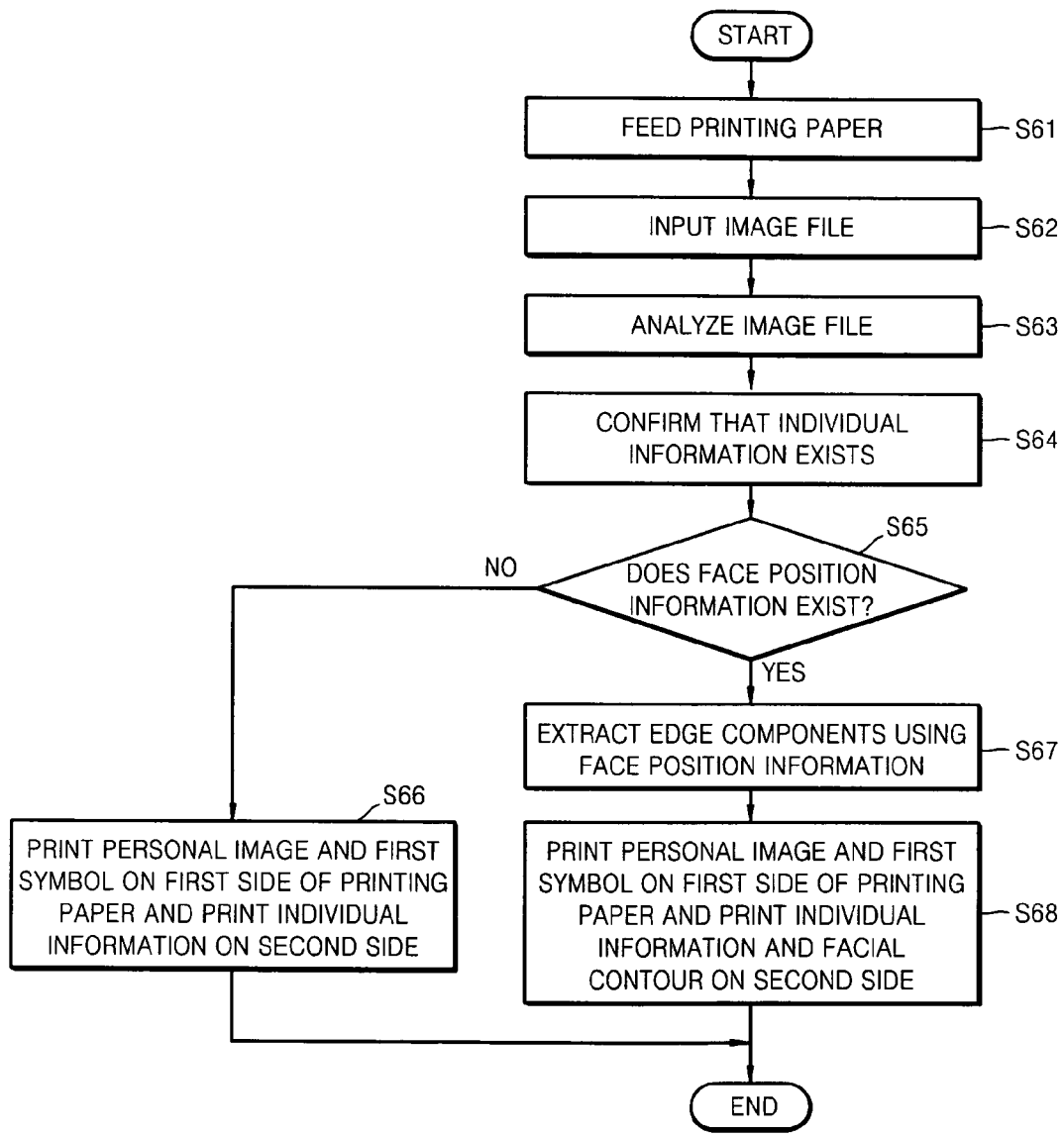
FIG. 6 is a flowchart illustrating an example of an image printing method according to another embodiment of the present invention.
Figure 7A:
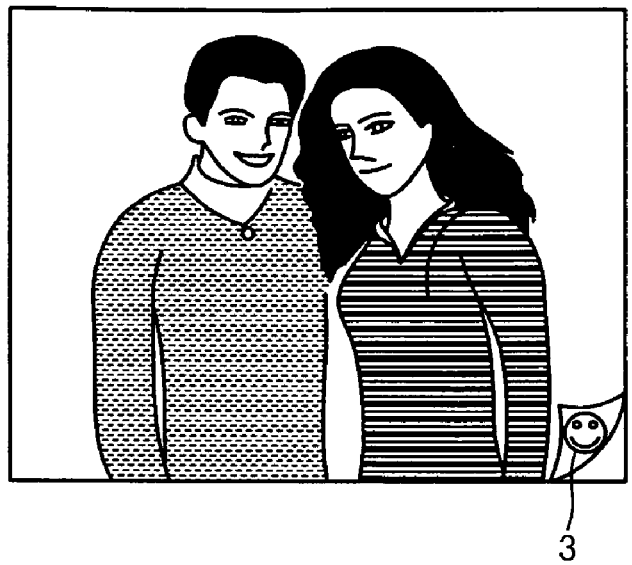
FIGS. 7A and 7B show a first side and a second side of an example of a printed matter printed using the image printing method illustrated in FIG. 6, according to an embodiment of the present invention.
Figure 7B:
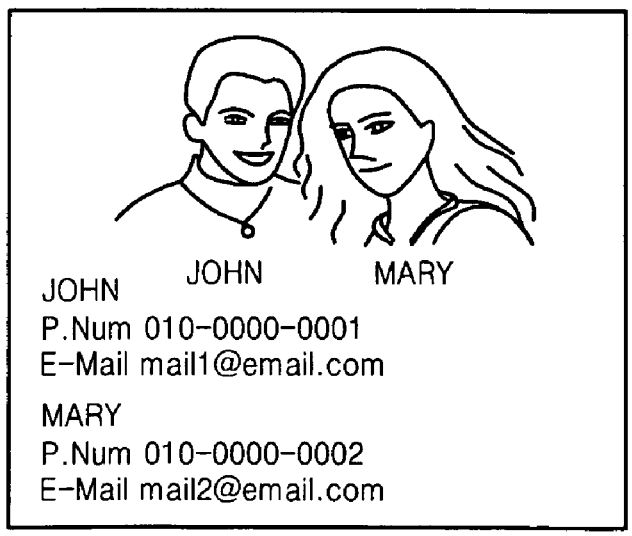

FIG. 6 is a flowchart illustrating an example of an image printing method using an image file including a personal image comprising at least one person, face recognition information of the person, and individual information corresponding to the face recognition information, according to another embodiment of the present invention. FIGS. 7A and 7B respectively show a first side and a second side of an example of a printed matter printed using the image printing method illustrated in FIG. 6, according to an embodiment of the present invention.

Referring to FIG. 6, a sheet of printing paper is fed into an image printing apparatus in operation S61, an image file is input in operation S62, the image file is analyzed in operation S63, and it is confirmed in operation S64 that individual information exists. It is determined in operation S65 whether face recognition information includes face position information. The face position information may be X and Y coordinates of a facial region of a person and horizontal and vertical lengths of the facial region, which are obtained from the personal image.

If it is determined in operation S65 that the face recognition information does not include the face position information, the personal image is printed on a first side of the sheet of printing paper and the individual information is printed on a second side of the sheet of printing paper in operation S66. If it is determined in operation S65 that the face recognition information includes the face position information, an edge component of the face is extracted using the face position information in operation S67. The edge component of the face can be obtained by means of sobel edge detection of the personal image. For example, if a 3×3-filter as illustrated in Table 1 below is applied to the personal image, only the edge component of the facial region of the person is extracted.

TABLE 1

| | | |
|---|---|---|
| 1 | 1 | 1 |
| 1 | −7 | 1 |
| 1 | 1 | 1 |

This uses the principle that since a person's face basically has a very robust high frequency component in both horizontal and vertical directions, this facial characteristic can be correctly detected by means of, for example, a sobel edge detector. A contour of the face can be determined from the detected edge component of the face. The personal image and a first symbol indicating that the individual information is printed on the second side of the sheet of printing paper are printed on the first side of the sheet of printing paper and the individual information and the contour of the face are printed on the second side of the sheet of printing paper in operation S68.

For example, referring to FIG. 7A, a personal image of John and Mary and a first symbol 3, which indicates that individual information is printed on a second side of a sheet of printing paper, are printed on a first side of the sheet of printing paper. Referring to FIG. 7B, a facial contour and individual information of John and Mary are printed on the second side of the sheet of printing paper. By printing individual information and a facial contour of person(s) on a rear side of a printed matter on which a personal image is printed, face(s) and individual information of the person(s) on the printed matter can be recalled instantly or substantially instantly.

Figure 8:
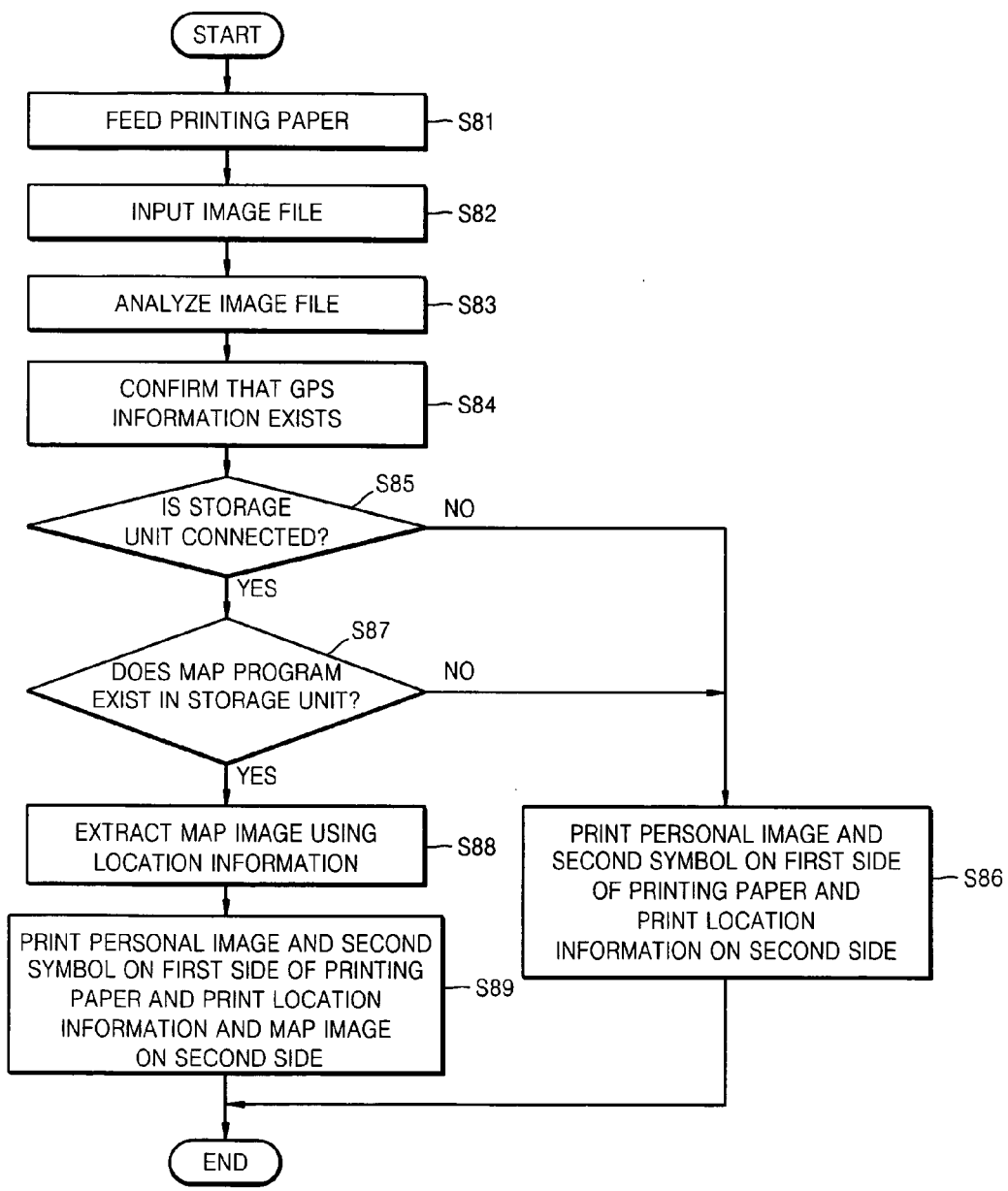
FIG. 8 is a flowchart illustrating an example of an image printing method according to another embodiment of the present invention.
Figure 9A:
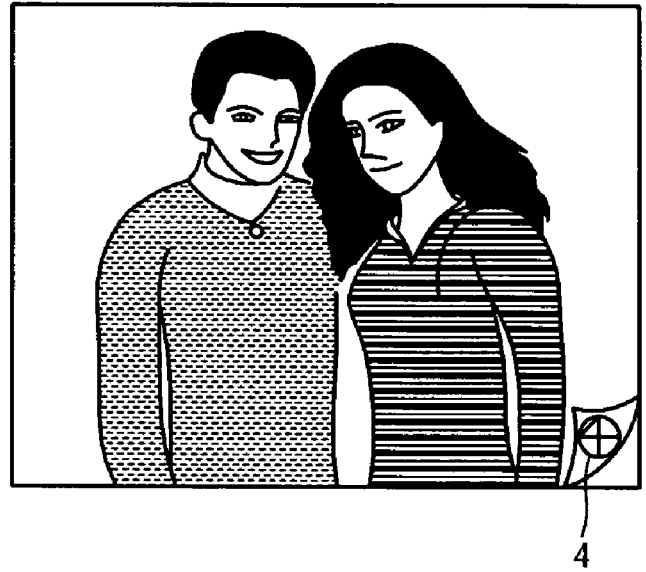
FIGS. 9A and 9B show a first side and a second side of an example of a printed matter printed using the image printing method illustrated in FIG. 8, according to an embodiment of the present invention.
Figure 9B:
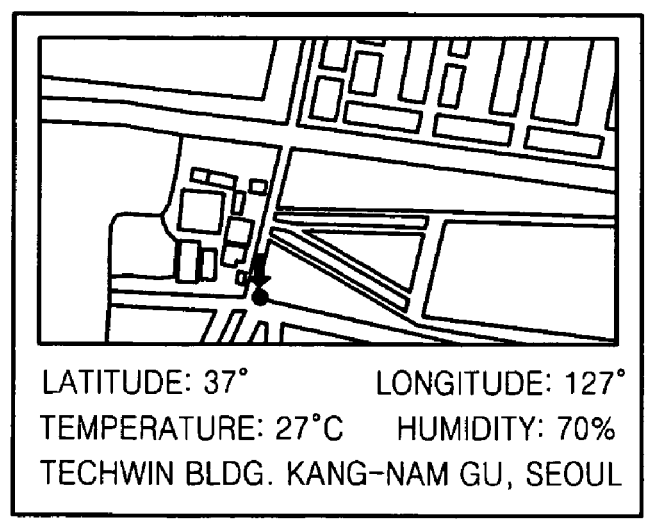

FIG. 8 is a flowchart illustrating an example of an image printing method using an image file including a personal image comprising at least one person and location information with which the personal image is captured, according to another embodiment of the present invention. FIGS. 9A and 9B show a first side and a second side of an example of a printed matter printed using the image printing method illustrated in FIG. 8, according to an embodiment of the present invention. Referring to FIG. 8, a sheet of printing paper is fed into an image printing apparatus in operation S81, an image file is input into the image printing apparatus in operation S82, the image file is analyzed in operation S83, and it is confirmed in operation S84 that location information exists. It is determined in operation S85 whether a storage unit is connected to the image printing apparatus. The storage unit may be an internal storage unit installed in the image printing apparatus or an external storage unit outside the image printing apparatus. The external storage unit may be a PC, a cellular phone, or a server connected through the Internet.

If it is determined in operation S85 that a storage unit is not connected, a personal image is printed on a first side of the sheet of printing paper and the location information is printed on a second side of the sheet of printing paper in operation S86.

If it is determined in operation S85 that a storage unit is connected, it is determined in operation S87 whether a map program exists in the storage unit. If it is determined in operation S87 that a map program exists in the storage unit, a map image corresponding to the location information is extracted in operation S88. A personal image and a second symbol, which indicates that the location information is printed on the second side of the sheet of printing paper, are printed on the first side of the sheet of printing paper, and the location information and the map image are printed on the second side of the sheet of printing paper in operation S89. Referring to FIGS. 9A and 9B, a personal image of John and Mary and a second symbol 4 are printed on a first side of a sheet of printing paper, and location information of the time at which the personal image of John and Mary was captured, for example, latitude, longitude, temperature, humidity, and address, is printed with a map image corresponding to the address on a second side of the sheet of printing paper.

In this current embodiment, by printing a personal image on a first side of the sheet of printing paper and printing location information and a map image corresponding to the location information on a second side of the sheet of printing paper, a place where the personal image was captured can be easily recalled by referring to the second side of the printed matter, and a user can easily go to the place with only the printed matter.

Figure 10A:
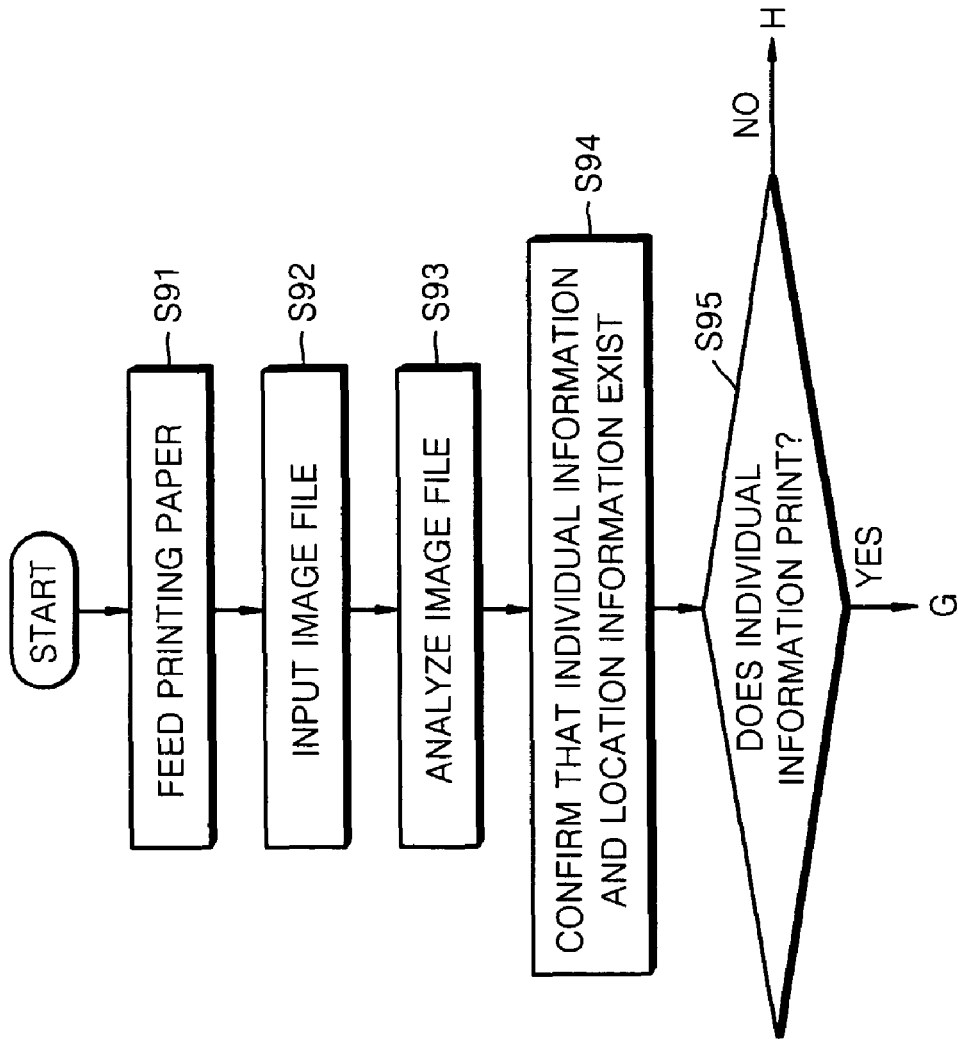
Figure 10B:
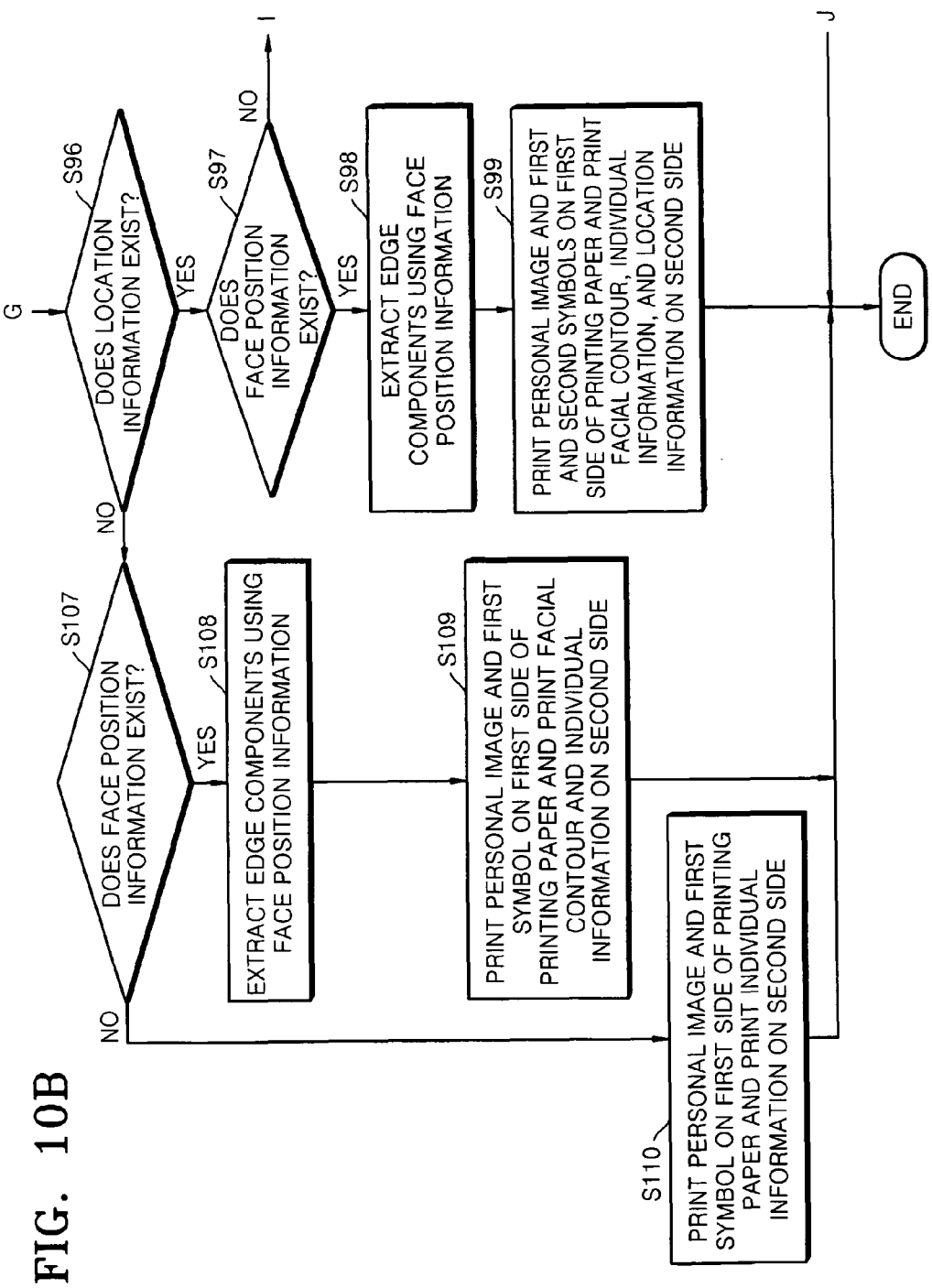
Figure 11A:
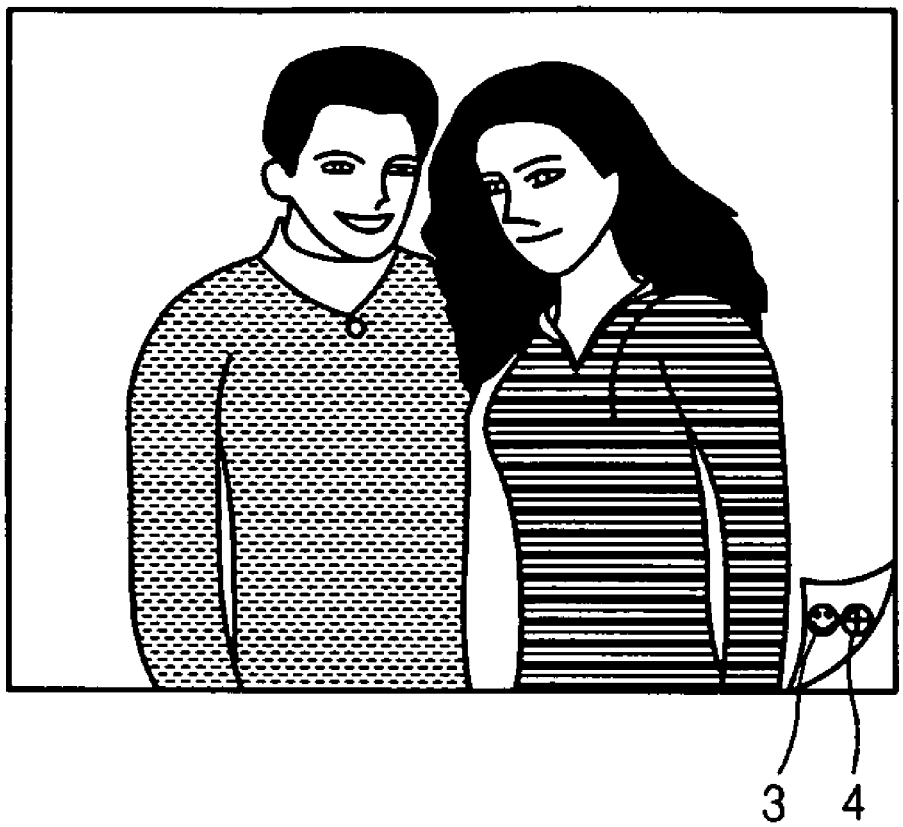
FIGS. 11A, 11B, and 11C show examples of printed matters printed using the image printing method illustrated in FIG. 10; according to an embodiment of the present invention.
Figure 11B:
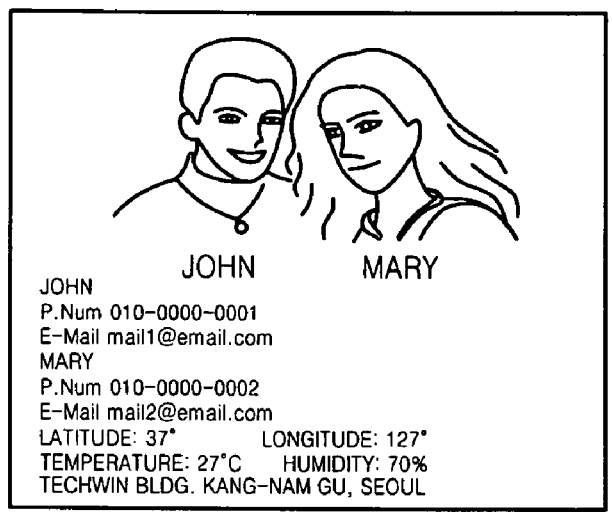
Figure 11C:
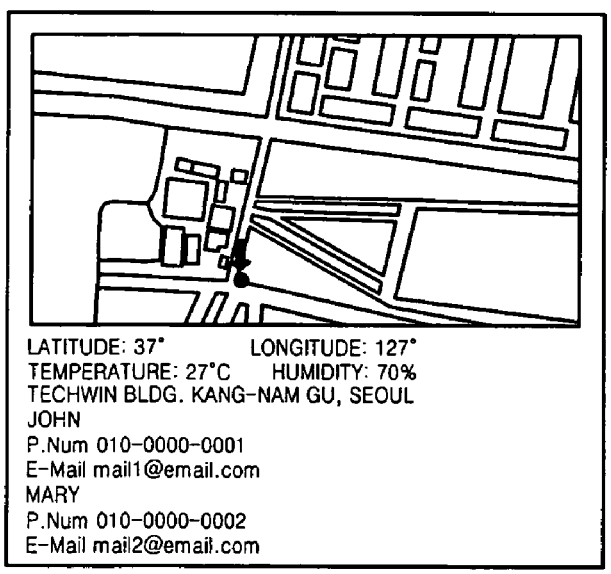

FIGS. 10A, 10B and 10C are flowcharts illustrating an example of an image printing method according to another embodiment of the present invention. In the current embodiment, the image printing method uses an image file including a personal image comprising at least one person, face recognition information of the person, and individual information corresponding to the face recognition information and location information. FIGS. 11A, 11B, and 11C show examples of printed matters printed using the image printing method illustrated in FIGS. 10A, 10B and 10C, according to an embodiment of the present invention. Referring to FIG. 10A, a sheet of printing paper is fed into an image printing apparatus in operation S91, an image file is input into the image printing apparatus in operation S92, the image file is analyzed in operation S93, and it is confirmed in operation S94 that individual information and location information exist.

In this embodiment, since both the individual information and the location information exist, it is determined which one of the information is printed. For example, it is determined in operation S95 whether the individual information is printed.

Referring to FIG. 10B, if it is determined in operation S95 that the individual information is printed, it is determined in operation S96 whether the location information is printed. If it is determined in operation S96 that the location information is also printed, it is determined in operation S97 whether face recognition information includes face position information.

If it determined in operation S97 that the face recognition information includes face position information, facial edge components are extracted using the face position information in operation S98, and a facial contour is determined from the facial edge components. A personal image is printed on a first side of the sheet of printing paper and the facial contour, the individual information, and the location information are printed on a second side of the sheet of printing paper in operation S99. In addition, first and second symbols, which respectively indicate that the individual information and the location information are printed on the second side of the sheet of printing paper, are printed on the first side of the sheet of printing paper.

Referring to FIGS. 10A and 10C, if it is determined in operation S95 that the individual information is not printed, it is determined in operation S100 whether the location information is printed.

If it is determined in operation S100 that the location information is printed, it is determined in operation S101 whether a storage unit is connected to the image printing apparatus. If it is determined in operation S101 that a storage unit is connected to the image printing apparatus, it is determined in operation S102 the storage unit includes a map program.

If it is determined in operation S102 that the storage unit includes a map program, a map image is extracted using the location information in operation S103, and the personal image and the second symbol, which indicates that the location information is printed on the second side of the sheet of printing paper, are printed on the first side of the sheet of printing paper and the location information and the map image are printed on the second side of the sheet of printing paper in operation S104.

When the individual information is not printed and the location information is printed, if a storage unit is not connected or the storage unit does not include a map program, the personal image and the second symbol, which indicates that the location information is printed on the second side of the sheet of printing paper, are printed on the first side of the sheet of printing paper and the location information is printed on the second side of the sheet of printing paper in operation S105. If neither the individual information nor the location information is printed, only the personal image can be printed on the first side of the sheet of printing paper in operation S106.

Referring to FIG. 10B, if the individual information is printed and the location information is not printed, it is determined in operation S107 whether the face recognition information includes face position information.

If it determined in operation S107 that the face recognition information includes face position information, the facial edge components are extracted using the face position information in operation S108, and the facial contour is determined from the facial edge components. The personal image and the first symbol are printed on the first side of the sheet of printing paper and the facial contour and the individual information are printed on the second side of the sheet of printing paper in operation S109. If it determined in operation S107 that the face recognition information does not include face position information, the personal image and the first symbol, which indicates that the individual information is printed on the second side of the sheet of printing paper, are printed on the first side of the sheet of printing paper and the individual information is printed on the second side of the sheet of printing paper in operation S110.

Referring to FIGS. 10B and 10C, when both the individual information and the location information are printed, if it determined in operation S97 that the face recognition information does not include face position information, it is determined in operation S111 whether a storage unit is connected to the image printing apparatus. If it is determined in operation S111 that a storage unit is connected to the image printing apparatus, it is determined in operation S112 whether the storage unit includes a map program. If it is determined in operation S112 that the storage unit includes a map program, a map image is extracted using the location information in operation S113, and the personal image and the first and second symbols are printed on the first side of the sheet of printing paper and the map image, the location information, and the individual information are printed on the second side of the sheet of printing paper in operation S114. If a storage unit is not connected, or if the storage unit does not include a map program, the personal image and the first and second symbols are printed on the first side of the sheet of printing paper and the individual information and the location information are printed on the second side of the sheet of printing paper in operation S115.

In this embodiment, although it is determined whether the individual information is printed and it is determined whether the location information is printed, the present invention is not limited to this sequence. That is, even if the sequence is exchanged, it is included in the scope of the present invention, and it can be simultaneously determined whether the individual information and the location information are printed. In another embodiment of the present invention, it can be previously set that the individual information is printed earlier than the location information.

FIG. 11A is an example of a photographic image showing the first side of the sheet of printing paper on which the personal image of John and Mary is printed. In addition, the first symbol 3 and the second symbol 4, which respectively indicate that the individual information and the location information are printed on the second side of the sheet of printing paper, are further printed on the first side of the sheet of printing paper.

FIG. 11B is an example of a photographic image showing the second side of the sheet of printing paper on which the facial contour of John and Mary, the individual information of John and Mary, and the location information of the capturing place are printed, in a case in which the face recognition information includes face position information. FIG. 11C is an example of a photographic image showing the second side of the sheet of printing paper on which the map image of the place where the image of John and Mary was captured, the individual information of John and Mary, and the location information of the place are printed.

Figure 12:
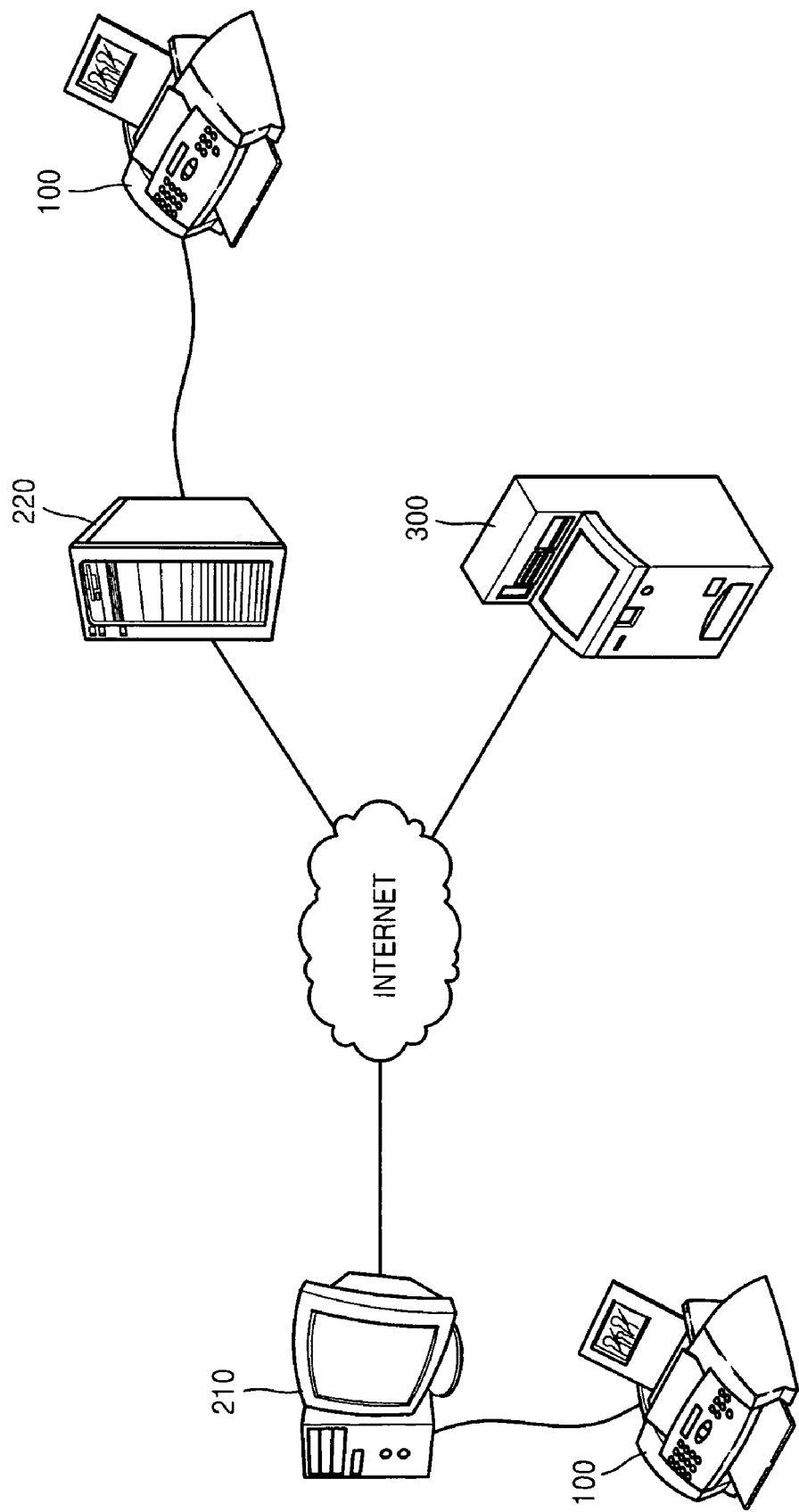
FIG. 12 illustrates an example of a network including an image printing apparatus, according to an embodiment of the present invention.

FIG. 12 illustrates an example of a network including an image printing apparatus 100, according to an embodiment of the present invention. Referring to FIG. 12, the network according to the current embodiment of the present invention includes the image printing apparatus 100, a PC 210, a server 220, and a kiosk 300. According to an embodiment of the present invention, the image printing apparatus 100 can receive an image file from the PC 210, which is an external device, and print a personal image and individual information or location information on first and second sides of a sheet of printing paper, respectively. According to another embodiment of the present invention, the image printing apparatus 100 according to the current embodiment of the present invention can receive an image file from the server 220, such as a photograph developing site, and print a personal image and individual information or location information on first and second sides of a sheet of printing paper, respectively. According to further embodiment of the present invention, the image printing apparatus 100 can receive an image file from the kiosk 300 and print a personal image and individual information of a person or location information of a capturing place on first and second sides of a sheet of printing paper, respectively.

The PC 210, the server 220, and the kiosk 300 can transmit an image file or individual information corresponding to face recognition information to each other via the Internet in a wired or wireless manner. The PC 210 and the server 220 can be connected to the image printing apparatus 100 and transmit an image file or individual information corresponding to face recognition information to each other. The kiosk 300 includes a printing apparatus and may not be connected to a separate printing apparatus.

Figure 13:
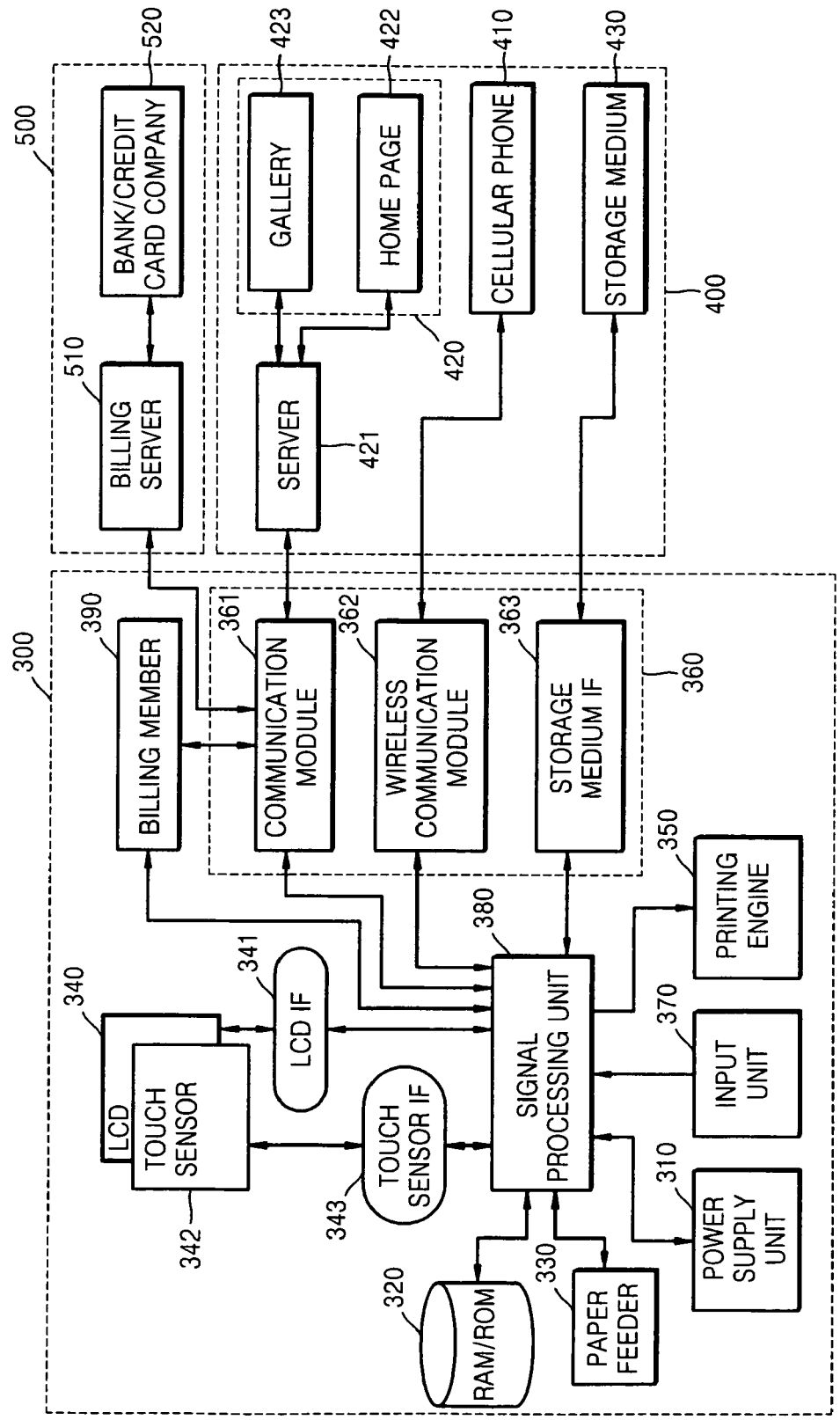
FIG. 13 is a block diagram of an example of a kiosk, which is an example of an image printing apparatus, according to an embodiment of the present invention.
Figure 14:
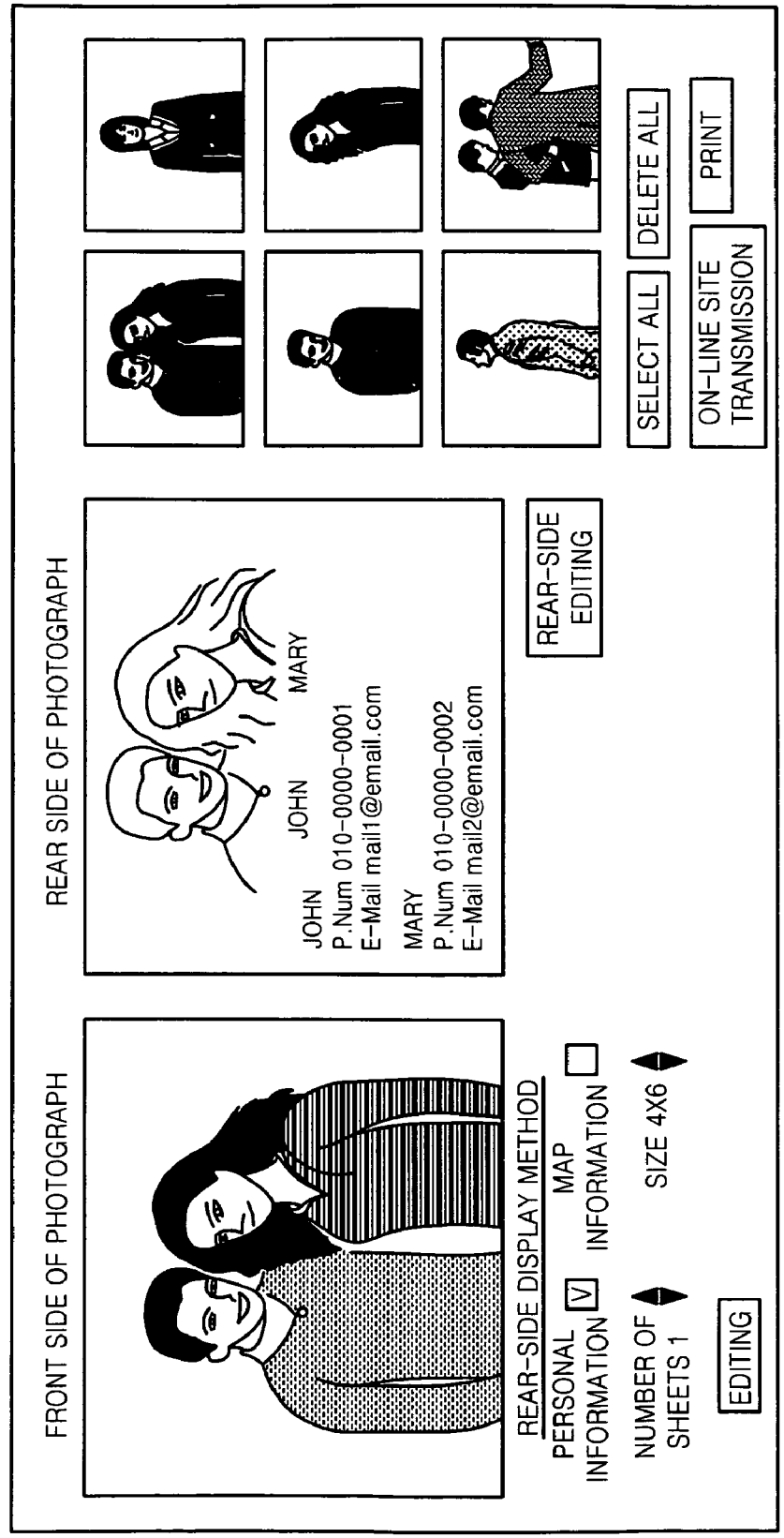
FIGS. 14, 15, and 16 are examples of screens displayed on a Liquid Crystal Display (LCD) of the kiosk illustrated in FIG. 13, according to embodiments of the present invention.
Figure 15:
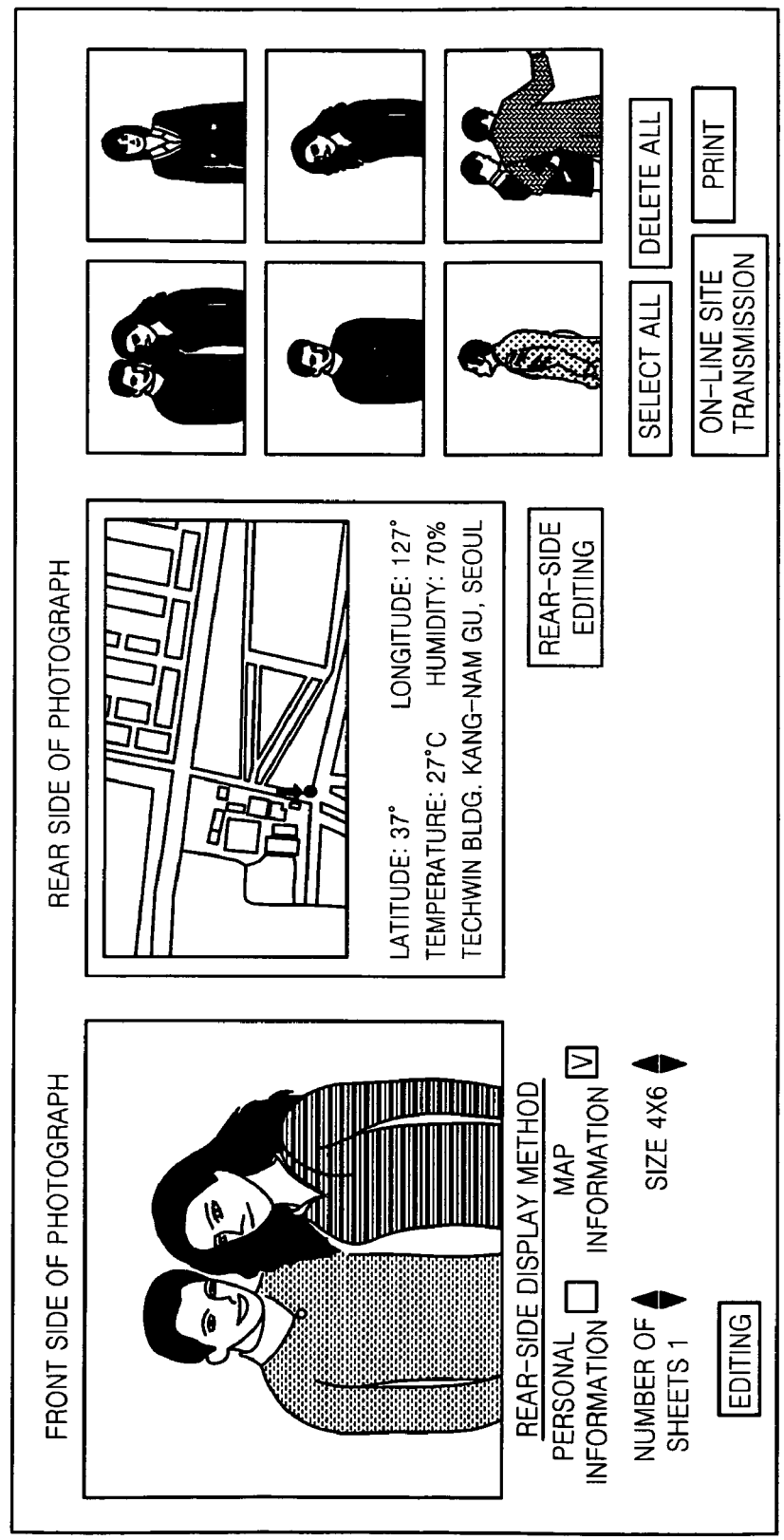
Figure 16:
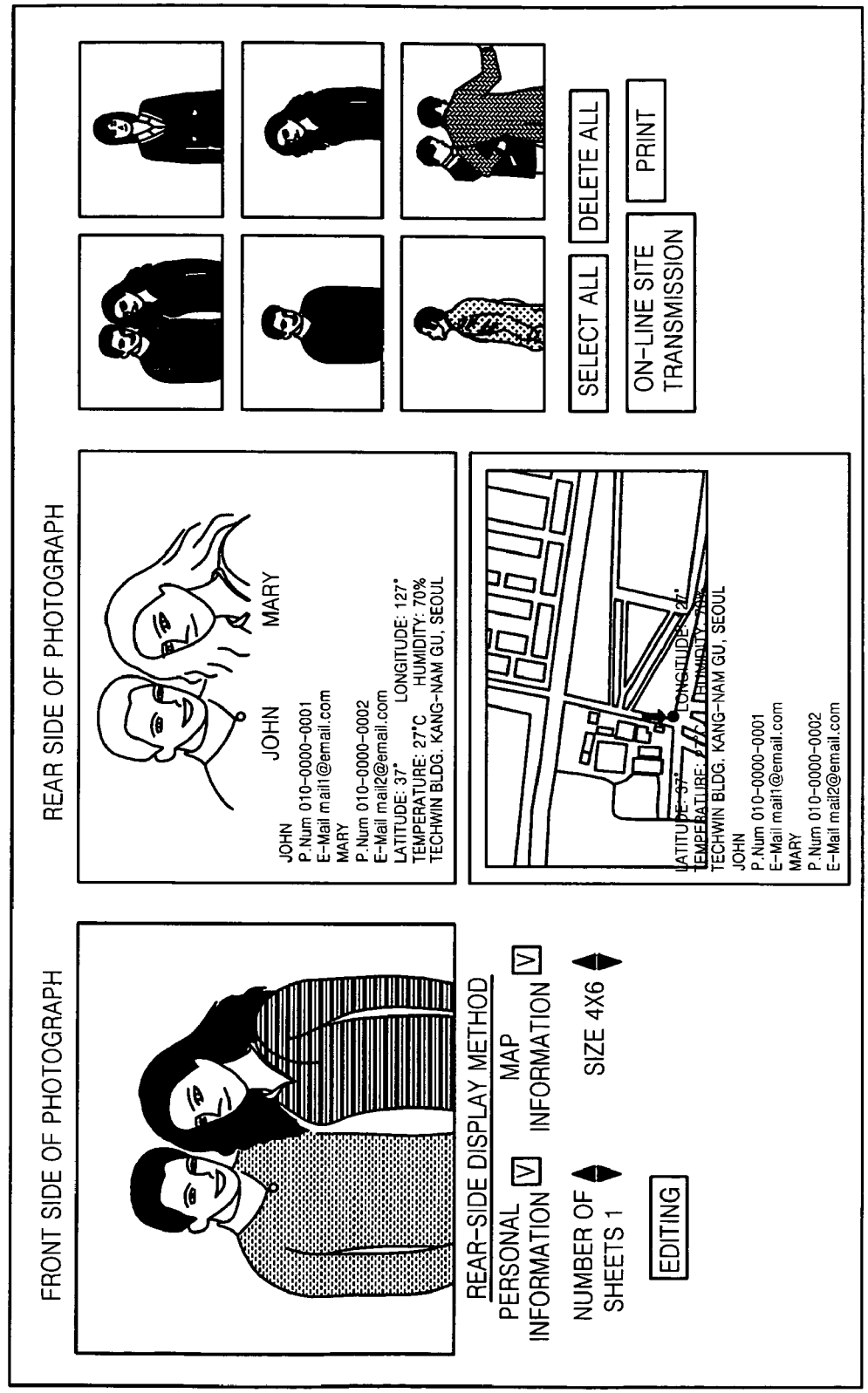

FIG. 13 is a block diagram of an example of a kiosk 300, which is an example of an image printing apparatus, according to an embodiment of the present invention and FIGS. 14, 15, and 16 are screens displayed on a Liquid Crystal Display (LCD) of the kiosk 300 illustrated in FIG. 13, according to embodiments of the present invention. Referring to FIG. 13, the kiosk 300 according to this embodiment of the present invention includes a power supply unit 310 supplying predetermined power to drive the kiosk 300, Random Access Memory (RAM)/Read Only Memory (ROM) 320, which is a storage unit, a paper feeder 330 feeding printing paper, a Liquid Crystal Display (LCD) 340, which is the display unit, a printing engine 350 printing an image and/or information on the printing paper, a connector 360 transmitting and receiving an image file or information to and from an external storage unit 400, and input unit 370, and a signal processing unit 380. This embodiment basically includes the image printing apparatus 100 illustrated in FIG. 1, and the configuration thereof will now be described in detail with reference to FIG. 13. The kiosk 300 includes the RAM/ROM 320 as a storage unit. For example, the RAM temporarily stores an image file before signal processing is performed, and the ROM stores a program for operating the kiosk 300.

While the kiosk 300 according to the current embodiment of the present invention includes the LCD 340 as a display unit, the present invention is not limited thereto, and the kiosk 300 can include an OLED as a display unit. The kiosk 300 also includes an LCD Interface (IF) 341 connecting the LCD 340 to the signal processing unit 380. The kiosk 300 also includes a touch sensor 342 on a front surface of the LCD 340 and a touch sensor IF 343 connecting the touch sensor 342 to the signal processing unit 380. A user can select an icon by touching the icon displayed on the LCD 340 by means of the touch sensor 342, and this selected signal can be transmitted to the signal processing unit 380 via the touch sensor IF 343.

The connector 360 includes a communication module 361 connected to a server 421 of the external storage unit 400, a wireless communication module (Bluetooth) 362 connected to a cellular phone 410 of the external storage unit 400, and a storage medium IF 363 connected to a storage medium 430 of the external storage unit 400. The server 421 is connected to a gallery 423 storing an individual information DB according to face recognition information or an image file or a homepage 422. The server 220 illustrated in FIG. 1 includes the gallery 423 and the homepage 422.

The kiosk 300 also includes a billing member 390 charging and receiving a predetermined amount of money for printing. The billing member 390 is linked to a billing server 510 and a bank/credit card company 520 so that settlement can be performed by means of cash, a credit card, or a cellular phone.

The signal processing unit 380 receives an image file from the external storage unit 400 via the connector 360 and generally controls the kiosk 300 to print a personal image included in the image file. That is, in this embodiment, the signal processing unit 380 controls the kiosk 300 to print individual information of the person or location information on a rear side of printing paper. The individual information is included in the image file and can be acquired from the image file or may be obtained from the external storage unit 400 using face recognition information included in the image file. The signal processing unit 380 also controls the kiosk 300 to print the location information included in the image file.

FIG. 14 is an example of screen of an LCD (refer to 340 of FIG. 13) on which a plurality of photographs are displayed before a photograph including John and Mary is printed, according to an embodiment of the present invention. The plurality of photographs can be obtained from an external storage unit, such as a memory card. In this example, six different photographs provided from the memory card are displayed on the LCD, and if a user wants to print all of the photographs, the user selects a 'select all' icon. Naturally, any suitable number of photographs can be displayed. If the user does not want to print any of the photographs, the user selects a 'delete all' icon and downloads other photographs from the memory card. If the user wants to print a photograph in the top left direction from among the six photographs, the user can magnify a front side of the photograph by selecting the photograph. The magnified front side of the photograph is shown in the left side of the LCD. When the user selects a photograph rear-side display method, individual information or map information to be printed on a rear side of the photograph is displayed. In this embodiment, the individual information is selected as the photograph rear-side display method, and a facial contour and individual information of John and Mary are printed on the rear side of the photograph. Thus, the facial contour and individual information to be printed on the rear side of the photograph are displayed. In this case, if the information is incorrect, the user can directly input the information by selecting a 'rear-side editing' icon. Also, the user can determine the number of pieces of the photograph to be printed, a size of the photograph, and so on.

If the user selects a 'print' icon, the personal image of John and Mary is printed on the front side of the photograph, and the facial contour and the individual information of John and Mary are printed on the rear side of the photograph. In addition, a first symbol indicating that the individual information is printed is further printed on the front side of the photograph.

Unlike the illustration of FIG. 14, FIG. 15 illustrates an example of a screen of the LCD in which map information is printed on the rear side of the photograph, according to an embodiment of the present invention. For example, location information of the time at which the image of John and Mary was captured and a map image extracted from a map program using the location information are displayed on the LCD in order to print the location information and the map image on the rear side of the photograph. If the user selects the 'print' icon, the displayed image is printed as it is. In addition, a second symbol indicating that the location information is printed on the rear side of the photograph may be further printed on the front side of the photograph.

FIG. 16 illustrates an example of a screen of the LCD in which both the individual information and the map information are printed on the rear side of the photograph, according to an embodiment of the present invention. A pattern printed on the rear side of the photograph can be various. In this embodiment, for example, the facial contour of John and Mary, the individual information of John and Mary, and the location information may be printed on the rear side of the photograph, or the map image corresponding to the location information, the individual information, and the location information may be printed on the rear side of the photograph. One of the rear-side images can be selected, and if the user selects the 'print' icon, the selected rear-side image can be printed. In addition, the first and second symbols respectively indicating that the individual information and the location information are printed on the rear side of the photograph can be further printed on the front side of the photograph. The kiosk 300 is a device for printing a photograph easily and any time, and by applying the image printing method according to an embodiment of the present invention to the kiosk 300, information regarding captured image(s) or information regarding a capturing place can be easily recalled by means of a rear side of the photograph.

As described above, according to the embodiments of the present invention, by printing a personal image on a first side of a sheet of printing paper and individual information or location information on a second side of the sheet of printing paper using an image file including the personal image, face recognition information, and the individual information according to the face recognition information or location information, the memory of the time at which the image of the person was captured can be easily recalled with only the printed matter. For example, if a long time elapses after an image of a plurality of people is captured, information regarding the people or the memory of the time at which the image of the people was captured is not clearly recalled; however, by printing a personal image of the people on a first side of a sheet of printing paper and individual information of the people or location information of the capturing time, the memory of the capturing time can be maintained.

In addition, an image file including a personal image and face recognition information may further include individual information according to the face recognition information, or the individual information according to the face recognition information is stored in a database and stored in an internal storage unit of an image printing apparatus or an external storage unit, such as a storage device such as a PC or a cellular phone, a server, or a storage medium such as a memory card, and then the individual information can be obtained from the internal storage unit or the external storage unit. The latest individual information can be determined and selected, and non-selected individual information can be updated. Thus, by printing correct individual information on a second side of a sheet of printing paper, latest information of captured images can be provided.

In addition, an image, individual information, or location information to be printed on a first or second side of a sheet of printing paper can be confirmed before printing is performed. Thus, it can be determined whether an image or information to be printed is correct, and if it is determined that the image or information to be printed is incorrect, the image, the individual information, or the location information can be modified before printing is performed. For example, if a personal image to be printed on the first side of the sheet of printing paper is displayed as a preview, at least one of an icon indicating the existence of the individual information and the location information can be further displayed, and by selecting the icon, at least one of the individual information and the location information can be confirmed or modified before the printing is performed.

In addition, by printing the personal image and a symbol, which indicates that at least one of the individual information and the location information was printed on the second side of the sheet of printing paper, on the first side of the sheet of printing paper, it can be determined by checking only the first side that the individual information exists. Furthermore, at least one of the individual information and the location information can be obtained by viewing the second side of the printed matter.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. An image printing method for printing on the both sides of printing paper, comprising:
   providing an image file comprising a personal image comprising at least one person and face recognition information of the person to a printing apparatus;
   displaying the personal image to be printed on the first side of the sheet of printing paper or individual information corresponding to the face recognition information to be printed on the second side of the sheet of printing paper before the printing is performed;
   displaying an icon indicating the existence of the individual information of the person;
   selecting the icon to confirm the individual information if correct or modifying the individual information if incorrect;
   printing the personal image on a first side of the sheet of printing paper; and
   printing individual information corresponding to the face recognition information on a second side of the sheet of printing paper.

2. The image printing method of claim 1, further comprising extracting the individual information corresponding to the face recognition information from the image file when the image file further comprises the individual information.

3. The image printing method of claim 1, further comprising extracting the individual information corresponding to the face recognition information of the image file from a database of an internal storage unit of the printing apparatus when the database for individual information according to face recognition information is stored in the internal storage unit.

4. The image printing method of claim 1, further comprising extracting the individual information corresponding to the face recognition information of the image file from a database of an external storage unit of the printing apparatus when the database for individual information according to face recognition information is stored in the external storage unit.

5. The image printing method of claim 1, further comprising determining the latest individual information among at least two pieces of individual information selected from first individual information according to the face recognition information stored in the image file, second individual information according to the face recognition information stored in the internal storage unit of the printing apparatus, and third individual information according to the face recognition information stored in the external storage unit of the printing apparatus and extracting the latest individual information.

6. The image printing method of claim 1, further comprising displaying the personal image to be printed on the first side of the sheet of printing paper or the individual information to be printed on the second side of the sheet of printing paper before the printing is performed.

7. The image printing method of claim 6, further comprising displaying an icon indicating the existence of the individual information of the person.

8. The image printing method of claim 1, further comprising printing a symbol indicating that the individual information is printed on the second side of the sheet of printing paper on the first side of the sheet of printing paper.

9. The image printing method of claim 1, wherein the face recognition information further comprises face position information, and a contour of a face corresponding to the face position information is further printed on the second side of the sheet of printing paper.

10. An image printing method for printing on the both sides of printing paper, comprising:
    providing an image file comprising a personal image including at least one person, face recognition information of the person, and individual information corresponding to the face recognition information or location information of a place in which the personal image was captured to a printing apparatus;
    displaying the personal image to be printed on the first side of the sheet of printing paper, or the individual information or the location information to be printed on the second side of the sheet of printing paper, before the printing is performed;
    displaying a first icon indicating the existence of the individual information or a second icon indicating the existence of the location information;
    selecting the first or second icon to choose the individual information or the location information;
    printing the personal image on a first side of the sheet of printing paper; and printing the chosen individual information corresponding to the face recognition information or the chosen location information on a second side of the sheet of printing paper.

11. The image printing method of claim 10, wherein the individual information comprises at least one selected from a name, a cellular phone number, an e-mail, and an address of the person.

12. The image printing method of claim 10, wherein the location information comprises at least one selected from the name of a place at which the personal image was captured, a latitude of the place, a longitude of the place, weather of the place, and the time when the personal image was captured.

13. The image printing method of claim 10, further comprising displaying the personal image to be printed on the first side of the sheet of printing paper, or the individual information or the location information to be printed on the second side of the sheet of printing paper, before the printing is performed.

14. The image printing method of claim 13, further comprising displaying a first icon indicating the existence of the individual information or a second icon indicating the existence of the location information.

15. The image printing method of claim 13, wherein, if the first icon is selected, the individual information is displayed and if the second icon is displayed, the location information is displayed.

16. The image printing method of claim 13, wherein the face recognition information comprises face position information, and a contour of a face corresponding to the face position information is further printed on the second side of the sheet of printing paper.

17. The image printing method of claim 13, further comprising printing a map corresponding to the location information on the second side of the sheet of printing paper.

18. The image printing method of claim 10, further comprising printing on the first side of the sheet of printing paper, a first symbol indicating that the individual information is printed on the second side of the sheet of printing paper or a second symbol indicating that the location information is printed on the second side of the sheet of printing paper.

19. An image printing apparatus comprising: a paper feeder for feeding printing paper;
a storage unit for storing an image file comprising a personal image comprising at least one person and face recognition information of the person;
a signal processing unit for selecting individual information of the person corresponding to the face recognition information of the image file;
a display unit displaying the personal image or the individual information; and
a printing engine for printing the personal image on a first side of a sheet of printing paper and printing the individual information corresponding to the face recognition information of the image file on a second side of the sheet of printing paper, wherein the image file comprises the individual information corresponding to the face recognition information, and the signal processing unit extracts the individual information from the image file, and the display unit further displays a first icon indicating the existence of the individual information of the person that is selectable to confirm the individual information if it is correct, or to modify the individual information if it is incorrect.

20. The image printing apparatus of claim 19, further comprising a connector connected to an external storage unit comprising an individual image database according to face recognition information,
wherein the signal processing unit extracts individual information of the person corresponding to the face recognition information of the image file from the external storage unit via the connector.

21. The image printing apparatus of claim 19, wherein the external storage unit comprises at least one selected from a storage device, a server, and a storage medium in which the database is stored.

22. The image printing apparatus of claim 19, further comprising an internal storage unit which comprises an individual information database according to the face recognition information,
wherein the signal processing unit extracts individual information of the person corresponding to the face recognition information of the image file from the internal storage unit.

23. The image printing apparatus of claim 19, further comprising:
an internal storage unit which comprises an individual information database according to the face recognition information; and
a connector connected to an external storage unit comprising an individual image database according to face recognition information.

24. The image printing apparatus of claim 23, wherein the signal processing unit determines the latest individual information among at least two pieces of individual information extracted from first individual information according to the face recognition information stored in the image file, second individual information according to the face recognition information stored in the internal storage unit, and third individual information according to the face recognition information included in the database stored in the external storage unit, and extracts the latest individual information, and updates at least one piece of non-extracted individual information to the latest individual information.

25. The image printing apparatus of claim 19, further comprising a display unit displaying the personal image or the individual information.

26. The image printing apparatus of claim 25, wherein the display unit further displays a first icon indicating the existence of the individual information of the person.

27. The image printing apparatus of claim 19, wherein the printing engine further prints a first symbol indicating that the individual information of the person is printed on the first side of the sheet of printing paper.

28. The image printing apparatus of claim 19, wherein the face recognition information comprises face position information of the person, and the printing engine further prints a contour of a face corresponding to the face position information on the second side of the sheet of printing paper.

29. The image printing apparatus of claim 19, wherein the image file comprises location information, and
the printing engine prints the personal image on the first side of the sheet of printing paper and prints the location information on the second side of the sheet of printing paper without or with the individual information.

30. The image printing apparatus of claim 29, wherein the signal processing unit acquires a map according to the location information, and the printing engine further prints a map corresponding to the location information on the second side of the sheet of printing paper.

31. The image printing apparatus of claim 29, further comprising a connector connected to the external storage unit in which a map according to the location information is stored,
wherein the signal processing unit obtains the map corresponding to the location information from the external storage unit via the connector.

32. The image printing apparatus of claim 29, further comprising a display unit displaying the location information.

33. The image printing apparatus of claim 29, wherein the display unit displays a second icon indicating the existence of the location information.

34. The image printing apparatus of claim 29, wherein the printing engine prints a second symbol, which indicates that the location information is printed on the second side of the sheet of printing paper, on the first side of the sheet of printing paper.

* * * * *

UNITED STATES PATENT AND TRADEMARK OFFICE
CERTIFICATE OF CORRECTION

PATENT NO. : 8,411,316 B2
APPLICATION NO. : 12/218436
DATED : April 2, 2013
INVENTOR(S) : Ji-hyun Goh and Sung-cheol Bae It is certified that error appears in the above-identified patent and that said Letters Patent is hereby corrected as shown below:

IN THE CLAIMS:

In Claim 33, Column 23, line 1, replace "The image printing apparatus of claim 29"

with -- The image printing apparatus of claim 32 --

Signed and Sealed this
Twenty-seventh Day of August, 2013

Teresa Stanek Rea
*Acting Director of the United States Patent and Trademark Office*